United States Patent
Nethercott et al.

[19]

[11] Patent Number: 5,809,028
[45] Date of Patent: Sep. 15, 1998

[54] PROTOCOL CONVERTER FOR A WIRELESS TELECOMMUNICATIONS SYSTEM

[75] Inventors: Jonathan F. Nethercott, Guildford; Guy A. Cooper, Windsor; Jonathan A. Thompson, Newbury, all of United Kingdom

[73] Assignee: DSC Communications Corporation, Plano, Tex.

[21] Appl. No.: 658,844

[22] Filed: May 31, 1996

[30] Foreign Application Priority Data

Jun. 2, 1995 [GB] United Kingdom ............... 9511192
Feb. 22, 1996 [GB] United Kingdom ............... 9603787

[51] Int. Cl.[6] ......................................... H04J 3/16
[52] U.S. Cl. .......................................... 370/467
[58] Field of Search ........................ 370/395, 400, 370/401, 402, 464, 465, 466, 467, 469

[56] References Cited

U.S. PATENT DOCUMENTS

| | | | |
|---|---|---|---|
| 5,208,811 | 5/1993 | Kashio et al. | 370/467 |
| 5,323,392 | 6/1994 | Ishii et al. | 370/467 |
| 5,383,187 | 1/1995 | Vardakas et al. . | |
| 5,412,660 | 5/1995 | Chen et al. . | |
| 5,420,916 | 5/1995 | Sekiguchi | 370/467 |

FOREIGN PATENT DOCUMENTS

| | | |
|---|---|---|
| 0602787 | 6/1994 | European Pat. Off. . |
| 0663785 | 7/1995 | European Pat. Off. . |
| 8703444 | 6/1987 | WIPO . |
| 9107021 | 5/1991 | WIPO . |
| 9205485 | 4/1992 | WIPO . |
| 9406232 | 3/1994 | WIPO . |
| 9510150 | 4/1995 | WIPO . |

OTHER PUBLICATIONS

Nasser Modiri, "The ISO Reference Model Entities", IEEE Network, vol. 5, No. 4, Jul. 1991, pp. 24–33.

*Primary Examiner*—Ajit Patel
*Attorney, Agent, or Firm*—Baker & Botts, L.L.P.

[57] ABSTRACT

A protocol converter for a wireless telecommunications system, the protocol converter comprising: an interface for receiving first protocol message packets from at least one control station of the telecommunications system and for transmitting first protocol message packets to the at least one control station; and a server in communication with the interface for maintaining the protocol converter and an object based telecommunications system control system; wherein the protocol converter converts first protocol message packets received from the interface into operations and converts operations into first protocol message packets for subsequent transmission to the at least one control station via the interface, the operations being received from and applied to the object based control system maintained in the server thereby to control the wireless telecommunications system.

12 Claims, 14 Drawing Sheets

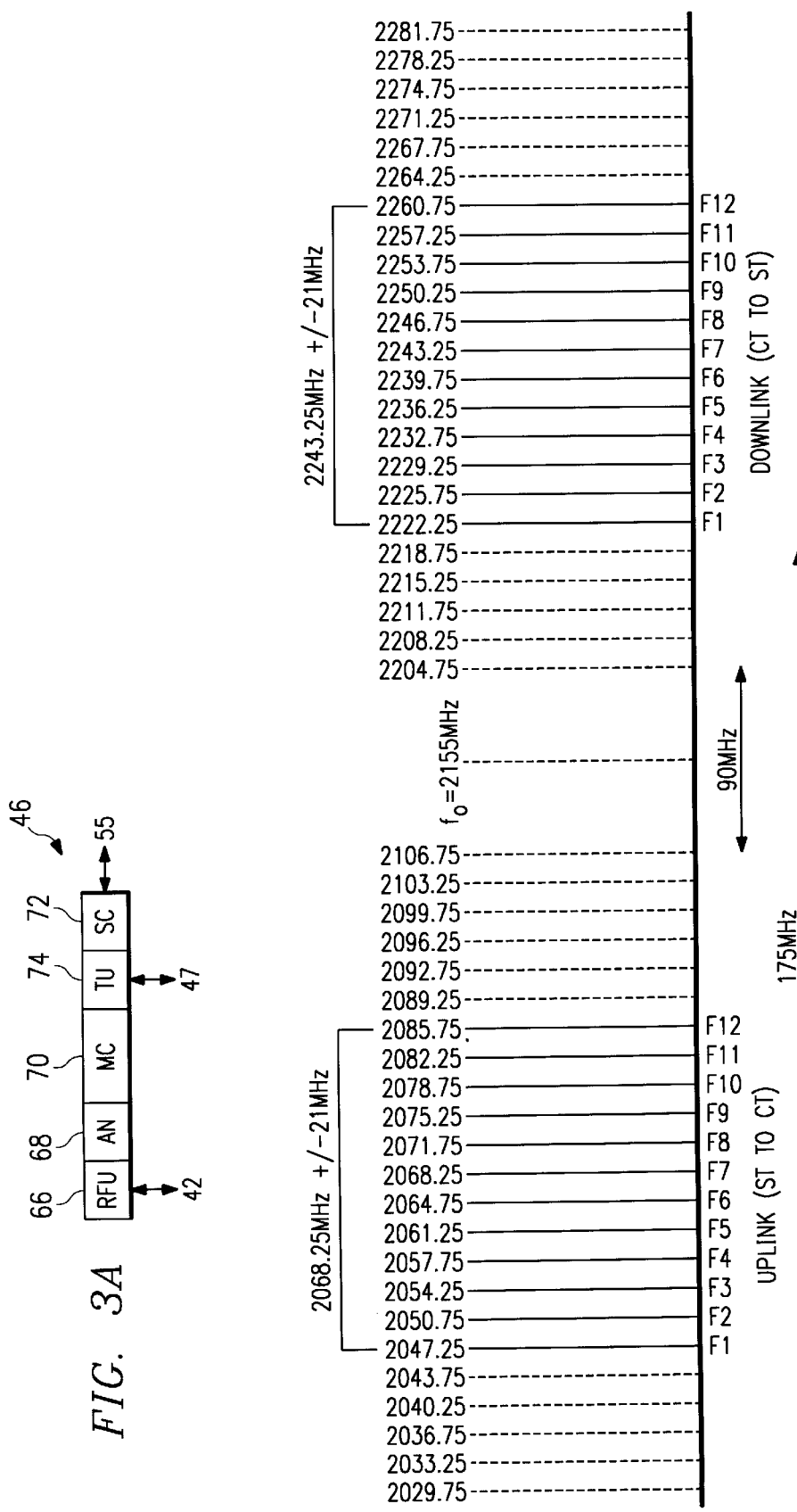

PROTOCOL CONVERTER FOR A WIRELESS TELECOMMUNICATIONS SYSTEM

TECHNICAL FIELD OF THE INVENTION

This invention relates to a protocol converter for a wireless telecommunications system.

BACKGROUND OF THE INVENTION

Previous wireless telecommunications systems comprise a server, a telecommunications transmitter/receiver and a control structure maintained on the server. There currently exist a large number of different competing systems manufactured by different manufacturers.

Whilst this arrangement provides for a number of adequate systems, it has the disadvantage that these systems are not interconnectable. That is to say that to date, a server manufactured by one manufacturer could not receive and/or transmit signals from a telecommunications transmitter/receiver manufactured by another manufacturer. This situation has the disadvantage of limiting the connectablity of any one system.

This situation has largely arisen because of the fact that each transmitter/receiver generates signals in a particular format or protocol that is specific to the control structure maintained on the server.

There is therefore a need in the art for a simple protocol converter that may be used to convert these different protocol signals into a simple standard set of signals which can be used to control the telecommunications system.

SUMMARY OF THE INVENTION

In accordance with the present invention, there is provided a protocol converter for a wireless telecommunications system, the protocol converter comprising: an interface for receiving first protocol message packets from at least one control station of the telecommunications system and for transmitting first protocol message packets to the at least one control station; and a server in communication with the interface for maintaining the protocol converter and an object based telecommunications system control system; wherein the protocol converter converts first protocol message packets received from the interface into operations and converts operations into first protocol message packets for subsequent transmission to the at least one control station via the interface, the operations being received from and applied to the object based control system maintained in the server thereby to control the wireless telecommunications system.

In this way, there is provided a converter that converts complex different format signals into simple operations.

Preferably, the converter has a multi-layer, for example a seven layer, structure.

In this case, it is preferred that a first layer is the interface, a second layer is a data link layer for transferring bytes of the first protocol message packets to and from the first layer, a third layer is a network layer for establishing connections between an object in the server and a lower layer or an object in the server and a higher layer, and for authenticating the identity of first protocol message packets and a fourth layer is a transport level, the transport level being provided for:

(a) constructing frames of data from a lower layer first protocol message packets and detecting and correcting errors in those lower layer message packets, or for (b) destructuring frames of data received from a higher layer into first protocol message packets, detecting and correcting errors in those first protocol message packets and transmitting those corrected message packets to the lower layer.

In this case, it is preferred that a sixth layer is a presentation layer for encoding lower layer first protocol message packets into at least one operation, and for decoding at least one operation from a higher layer into first protocol message packets. Preferably, encoding of first protocol message packets into at least one operation and decoding of at least one operation into first protocol message packets is accomplished by reference to a conversion table. In this case, the conversion table may comprise a list of component addresses for each component of said telecommunications system and a list of corresponding addresses of objects within said object based control structure.

Preferably, the seventh layer is an application layer for receiving and outputting the at least one operation from a lower layer and/or for receiving at least one operation from the server.

Preferably, there is provided a management layer for supervising operation of the protocol converter and for managing errors outside of the scope of individual layers of the protocol converter.

This arrangement conforms with international standards in the field and enables an efficient and simple device to be constructed.

Preferably, the first protocol is a sub-system management protocol (SMP).

Preferably, the operation is fully reversible and is either an "update" operation or a "retrieve" operation.

In accordance with a second aspect of the invention, there is provided a method of converting first protocol message packets into operations for the control of a wireless telecommunications system, the method comprising: transmitting first protocol message packets from at least one control station of the wireless telecommunications system to an interface connected to a server; and converting the first protocol message packets into operations, the conversion being accomplished by a protocol converter maintained in the server, the operations subsequently being used for controlling the wireless telecommunications system.

In accordance with a third aspect of the invention, there is provided a method of converting operations into first protocol message packets for the control of a wireless telecommunications system, the method comprising: converting the operations into first protocol message packets, the conversion being accomplished by a protocol converter maintained in a server, the first protocol message packets subsequently being used for controlling the wireless telecommunications system; and transmitting first protocol message packets to at least one control station of the wireless telecommunications system via an interface connected to the server.

In any of the above methods, it is preferred that the protocol converter comprises a protocol converter according to any of the aspects mentioned above.

These methods provide a simplified control structure that may be used with any manufacturer's equipment.

The scope of the present invention also extends to the use of a protocol converter according to any of the above mentioned aspects to convert first protocol message packets into operations, and vice versa, and to the use of a protocol converter according to any of the above mentioned aspects in accordance with any of the above mentioned methods.

BRIEF DESCRIPTION OF THE DRAWINGS

Embodiments of the invention will now be described, by way of example only, with reference to the accompanying drawings in which like reference signs are used for like features and in which:

FIG. 3A is a schematic illustration of a modem shelf of a central terminal of the telecommunications system of FIG. 1;

FIG. 4 is an illustration of an example of a frequency plan for the telecommunications system of FIG. 1;

DETAILED DESCRIPTION OF THE INVENTION

Figure 1:
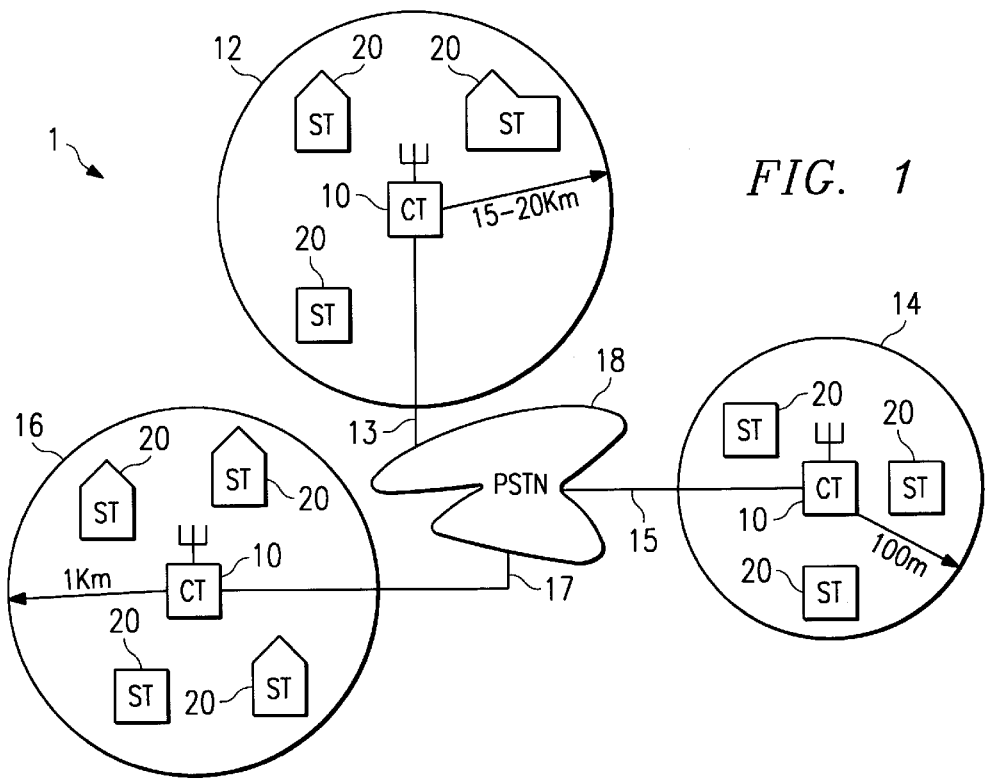
FIG. 1 is a schematic overview of an example of a wireless telecommunications system.

FIG. 1 is a schematic overview of an example of a wireless telecommunications system. The telecommunications system includes one or more service areas 12, 14 and 16, each of which is served by a respective central terminal (CT) 10 which establishes a radio link with subscriber terminals (ST) 20 within the area concerned. The area which is covered by a central terminal 10 can vary. For example, in a rural area with a low density of subscribers, a service area 12 could cover an area with a radius of 15–20 Km. A service area 14 in an urban environment where is there is a high density of subscriber terminals 20 might only cover an area with a radius of the order of 100 m. In a suburban area with an intermediate density of subscriber terminals, a service area 16 might cover an area with a radius of the order of 1 Km. It will be appreciated that the area covered by a particular central terminal 10 can be chosen to suit the local requirements of expected or actual subscriber density, local geographic considerations, etc, and is not limited to the examples illustrated in FIG. 1. Moreover, the coverage need not be, and typically will not be circular in extent due to antenna design considerations, geographical factors, buildings and so on, which will affect the distribution of transmitted signals.

The central terminals 10 for respective service areas 12, 14, 16 can be connected to each other by means of links 13, 15 and 17 which interface, for example, with a public switched telephone network (PSTN) 18. The links can include conventional telecommunications technology using copper wires, optical fibres, satellites, microwaves, etc.

The wireless telecommunications system of FIG. 1 is based on providing fixed microwave links between subscriber terminals 20 at fixed locations within a service area (e.g., 12, 14, 16) and the central terminal 10 for that service area. In a preferred embodiment each subscriber terminal 20 is provided with a permanent fixed access link to its central terminal 10. However, in alternative embodiments demand-based access could be provided, so that the number of subscribers which can be serviced exceeds the number of telecommunications links which can currently be active.

Figure 2:
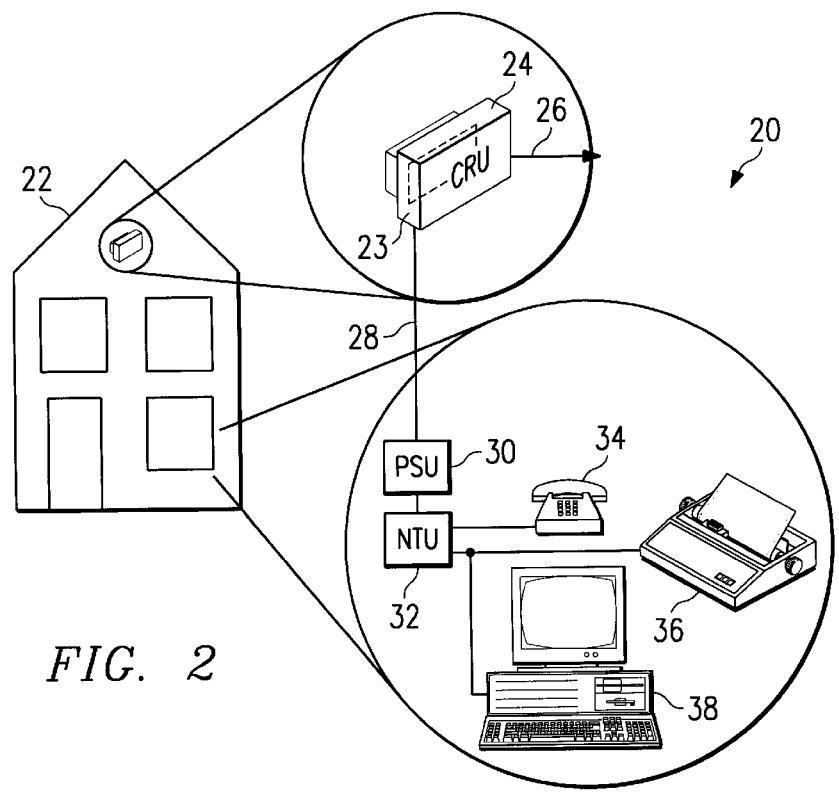
FIG. 2 is a schematic illustration of an example of a subscriber terminal of the telecommunications system of FIG. 1.

FIG. 2 illustrates an example of a configuration for a subscriber terminal 20 for the telecommunications system of FIG. 1. FIG. 2 includes a schematic representation of customer premises 22. A customer radio unit (CRU) 24 is mounted on the customer's premises. The customer radio unit 24 includes a flat panel antenna or the like 23. The customer radio unit is mounted at a location on the customer's premises, or on a mast, etc., and in an orientation such that the flat panel antenna 23 within the customer radio unit 24 faces in the direction 26 of the central terminal 10 for the service area in which the customer radio unit 24 is located.

The customer radio unit 24 is connected via a drop line 28 to a power supply unit (PSU) 30 within the customer's premises. The power supply unit 30 is connected to the local power supply for providing power to the customer radio unit 24 and a network terminal unit (NTU) 32. The customer radio unit 24 is also connected to via the power supply unit 30 to the network terminal unit 32, which in turn is connected to telecommunications equipment in the customer's premises, for example to one or more telephones 34, facsimile machines 36 and computers 38. The telecommunications equipment is represented as being within a single customer's premises. However, this need not be the case, as the subscriber terminal 20 preferably supports either a single or a dual line, so that two subscriber lines could be supported by a single subscriber terminal 20. The subscriber terminal 20 can also be arranged to support analogue and digital telecommunications, for example analogue communications at 16, 32 or 64 kbits/sec or digital communications in accordance with the ISDN BRA standard.

Figure 3:
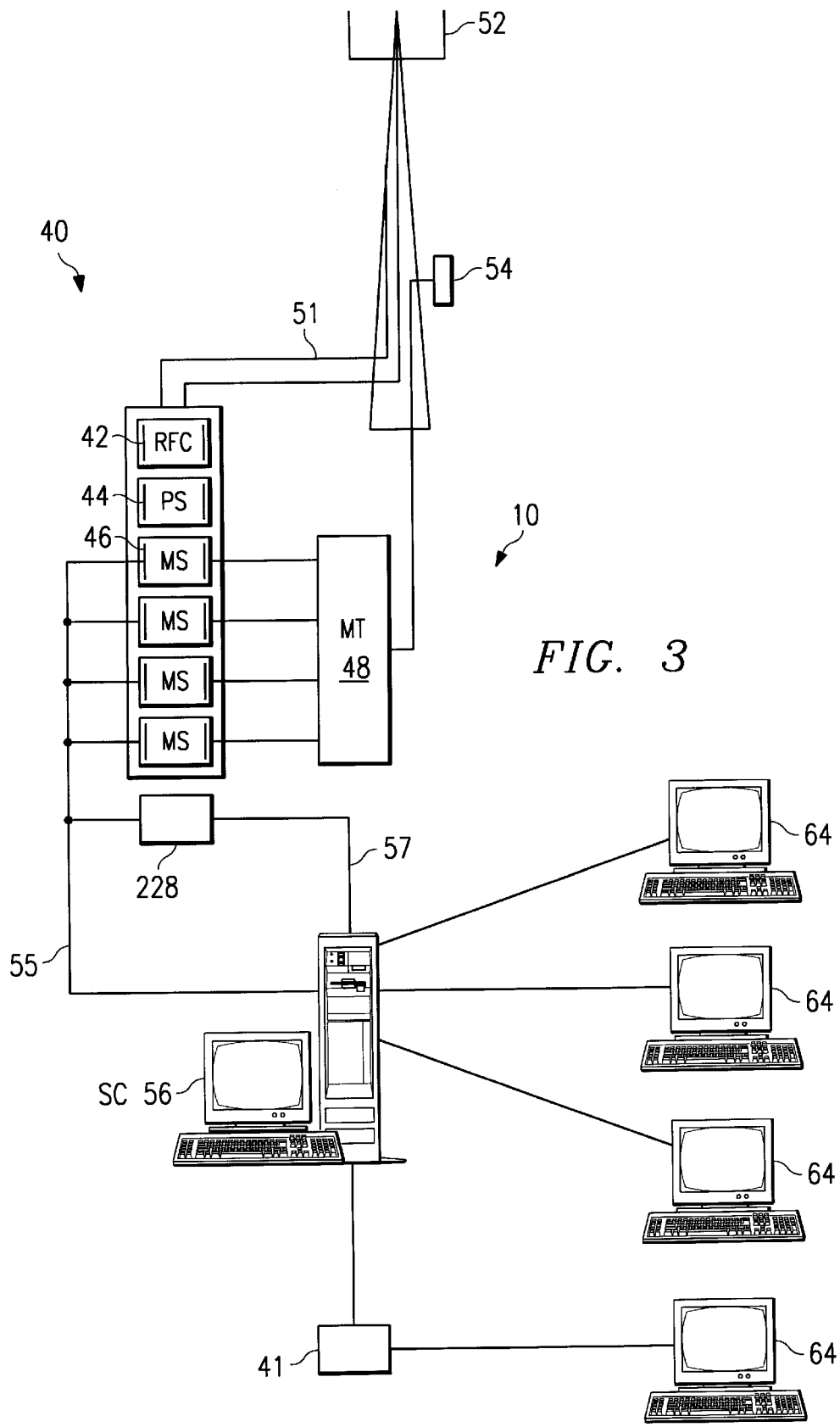
FIG. 3 is a schematic illustration of an example of a central terminal of the telecommunications system of FIG. 1.

FIG. 3 is a schematic illustration of an example of a central terminal of the telecommunications system of FIG. 1.

The common equipment rack 40 comprises a number of equipment shelves 42, 44, 46, including a RF Combiner and power amp shelf (RFC) 42, a Power Supply shelf (PS) 44 and a number of (in this example four) Modem Shelves (MS) 46. The RF combiner shelf 42 allows the four modem shelves 46 to operate in parallel. It combines and amplifies the power of four transmit signals, each from a respective one of the four modem shelves, and amplifies and splits received signals four ways so that separate signals may be passed to the respective modem shelves. The power supply shelf 44 provides a connection to the local power supply and fusing for the various components in the common equipment rack 40. A bidirectional connection extends between the RF combiner shelf 42 and the main central terminal antenna 52, typically an omnidirectional antenna, mounted on a central terminal mast 50.

This example of a central terminal 10 is connected via a point-to-point microwave link to a location where an interface to the public switched telephone network 18, shown schematically in FIG. 1, is made. As mentioned above, other types of connections (e.g., copper wires or optical fibres) can be used to link the central terminal 10 to the public switched telephone network 18. In this example the modem shelves are connected via lines 47 to a microwave terminal (MT) 48. A microwave link 49 extends from the microwave terminal 48 to a point-to-point microwave antenna 54 mounted on the mast 50 for a host connection to the public switched telephone network 18.

The central terminal 10 is connected to and controlled by a site controller (SC) 56 which is a powerful computer, preferably a server. The server 56 can be connected to each modem shelf of the central terminal 10 via, for example, RS232 connections 55. The server 56 provides functions such as the localisation of faults, alarms and status and the configuring of the central terminal 10. A server 56 will typically support a single central terminal 10, although a plurality of servers 56 could be networked for supporting a plurality of central terminals 10. As mentioned above, an object of this invention is to enable the remote control of a server from a remote client station. Accordingly, the server 56 is connectable to a plurality of remote client and remote server stations 64. The connection may be an ethernet link, a PSTN link via a modem 41 or other wireless link.

As an alternative to the RS232 connections 55, which extend to the server 56, data connections such as an X.25 link 57 could instead be provided from a pad 228 to the server 56.

As will be later described, the server 56 maintains an object based control structure for enabling the control of the wireless telecommunications system. Furthermore, and also as described below, the server (or indeed any server) may be remotely controlled from any remote client station.

FIG. 3A illustrates various parts of a modem shelf 46. A transmit/receive RF unit (RFU—for example implemented on a card in the modem shelf) 66 generates the modulated transmit RF signals at medium power levels and recovers and amplifies the baseband RF signals for the subscriber terminals. The RF unit 66 is connected to an analogue card (AN) 68 which performs A-D/D-A conversions, baseband filtering and the vector summation of 15 transmitted signals from the modem cards (MCs) 70. The analogue unit 68 is connected to a number of (typically 1–8) modem cards 70. The modem cards perform the baseband signal processing of the transmit and receive signals to/from the subscriber terminals 20. This includes ½ rate convolution coding and x 16 spreading with CDMA codes on the transmit signals, and synchronisation recovery, despreading and error correction on the receive signals. Each modem card 70 in the present example has two modems, each modem supporting one subscriber link (or two lines) to a subscriber terminal 20. Thus, with two modems per card and 8 modems per modem shelf, each modem shelf could support 16 possible subscriber links. However, in order to incorporate redundancy so that a modem may be substituted in a subscriber link when a fault occurs, only up to 15 subscriber links are preferably supported by a single modem shelf 46. The 16th modem is then used as a spare which can be switched in if a failure of one of the other 15 modems occurs. The modem cards 70 are connected to the tributary unit (TU) 74 which terminates the connection to the host public switched telephone network 18 (e.g., via one of the lines 47) and handles the signalling of telephony information to, for example, up to 15 subscriber terminals (each via a respective one of 15 of the 16 modems). The shelf is controlled by a shelf controller (SC) 72.

The wireless telecommunications between a central terminal 10 and the subscriber terminals 20 could operate on various frequencies. FIG. 4 illustrates one possible example of the frequencies which could be used. In the present example, the wireless telecommunication system is intended to operate in the 1.5–2.5 GHz Band. In particular the present example is intended to operate in the Band defined by ITU-R (CCIR) Recommendation F.701 (2025–2110 MHz, 2200–2290 MHz). FIG. 4 illustrates the frequencies used for the uplink from the subscriber terminals 20 to the central terminal 10 and for the downlink from the central terminal 10 to the subscriber terminals 20. It will be noted that 12 uplink and 12 downlink radio channels of 3.5 MHz each are provided centred about 2155 MHz. The spacing between the receive and transmit channels exceeds the required minimum spacing of 70 MHz.

In the present example, as mentioned above, each modem shelf will support 1 frequency channel (i.e. one uplink frequency plus the corresponding downlink frequency). Up to 15 subscriber links may be supported on one frequency channel, as will be explained later. Thus, in the present embodiment, each central terminal 10 can support 60 links, or 120 lines.

Typically, the radio traffic from a particular central terminal 10 will extend into the area covered by a neighbouring central terminal 10. To avoid, or at least to reduce interference problems caused by adjoining areas, only a limited number of the available frequencies will be used by any given central terminal 10.

Figure 5A:
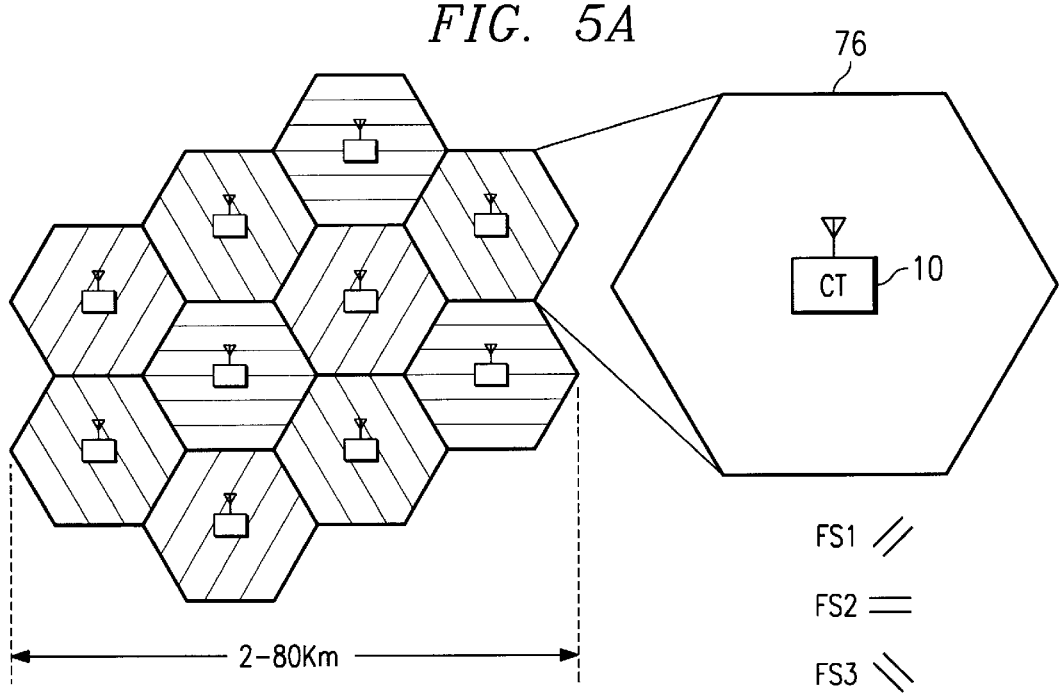
FIGS. 5A and 5B are schematic diagrams illustrating possible configurations for cells for the telecommunications system of FIG. 1.

FIG. 5A illustrates one cellular type arrangement of the frequencies to mitigate interference problems between adjacent central terminals 10. In the arrangement illustrated in FIG. 5A, the hatch lines for the cells 76 illustrate a frequency set (FS) for the cells. By selecting three frequency sets (e.g., where: FS1=F1, F4, F7, F10; FS2=F2, F5, F8, F11; FS3=F3, F6, F9, F12), and arranging that immediately adjacent cells do not use the same frequency set (see, for example, the arrangement shown in FIG. 5A), it is possible to provide an array of fixed assignment omnidirectional cells where interference between nearby cells can be avoided. The transmitter power of each central terminal 10 is set such that transmissions do not extend as far as the nearest cell which is using the same frequency set. Thus each central terminal 10 can use the four frequency pairs (for the uplink and downlink, respectively) within its cell, each modem shelf in the central terminal 10 being associated with a respective RF channel (channel frequency pair).

Figure 5B:
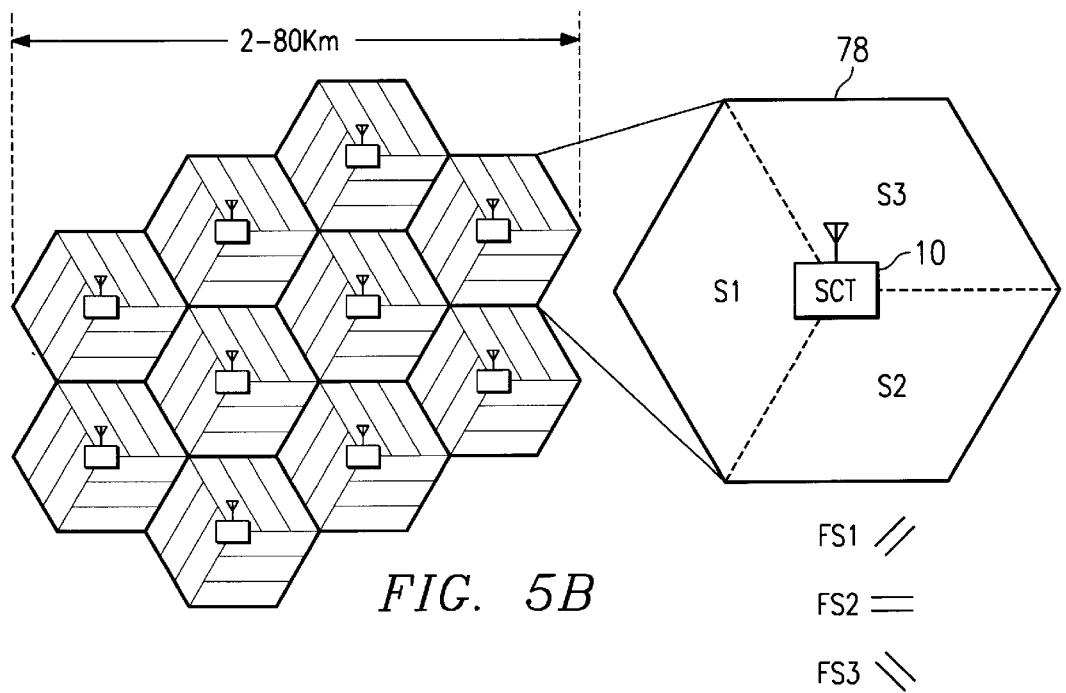

With each modem shelf supporting one channel frequency (with 15 subscriber links per channel frequency) and four modem shelves, each central terminal 10 will support 60 subscriber links (i.e., 120 lines). The 10 cell arrangement in FIG. 5A can therefore support up to 600 ISDN links or 1200 analogue lines, for example. FIG. 5B illustrates a cellular type arrangement employing sectored cells to mitigate problems between adjacent central terminals 10. As with FIG. 5A the different type of hatch lines in FIG. 5B illustrate different frequency sets. As in FIG. 5A, FIG. 5B represents three frequency sets (e.g., where: FS1=F1, F4, F7, F10; FS2=F2, F5, F8, F11; FS3=F3, F6, F9, F12). However, in FIG. 5B the cells are sectored by using a sectored central terminal (SCT) 13 which includes three central terminals 10, one for each sector S1, S2 and S3, with the transmissions for each of the three central terminals 10 being directed to the appropriate sector among S1, S2 and S3. This enables the number of subscribers per cell to be increased three fold, while still providing permanent fixed access for each subscriber terminal 20.

A seven cell repeat pattern is used such that for a cell operating on a given frequency, all six adjacent cells operating on the same frequency are allowed unique PN codes. This prevents adjacent cells from inadvertently decoding data.

Figure 6:
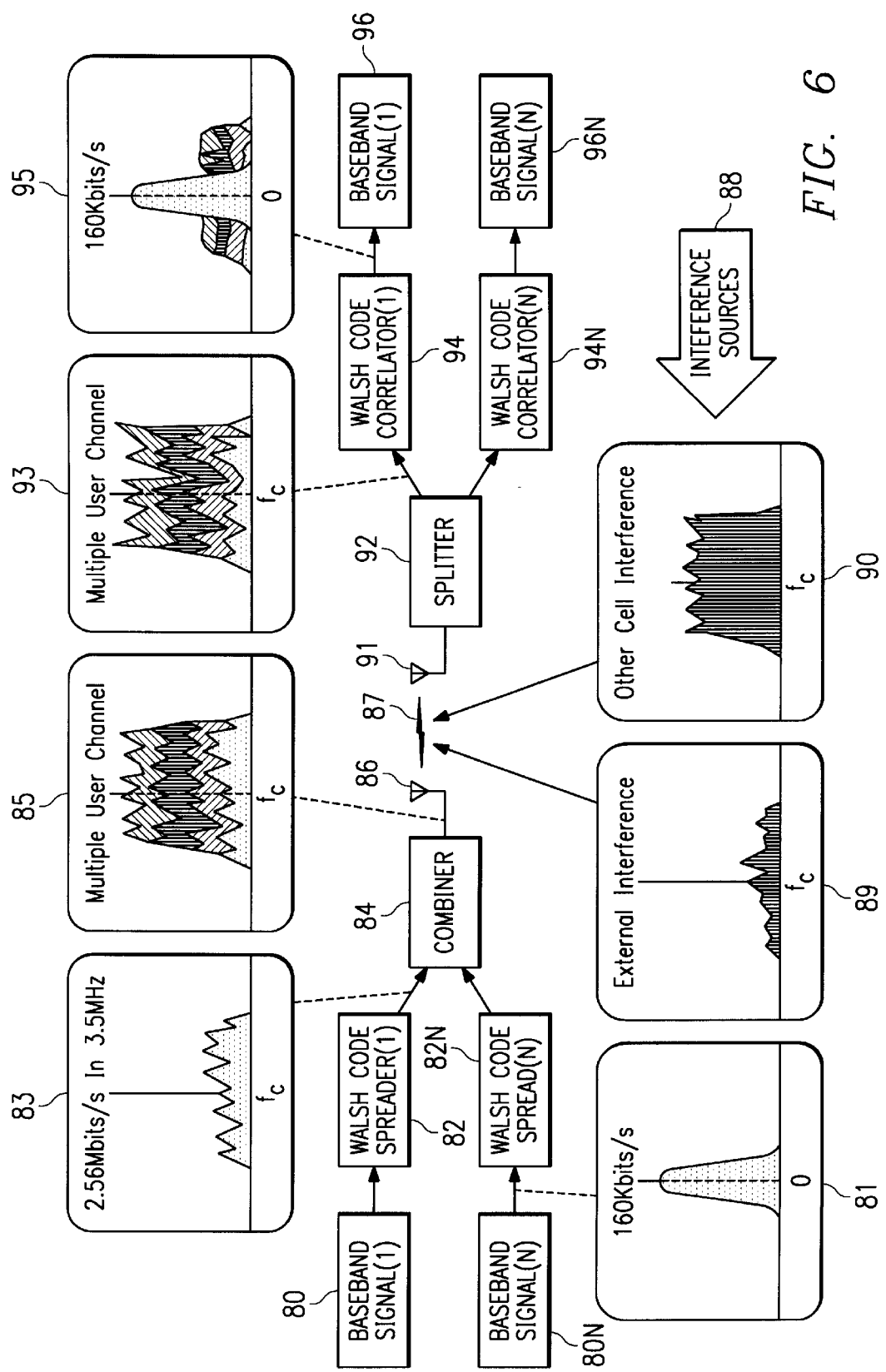
FIG. 6 is a schematic diagram illustrating aspects of a code division multiplex system for the telecommunications system of FIG. 1.

As mentioned above, each channel frequency can support 15 subscriber links. In this example, this is achieved using by multiplexing signals using a Code Division Multiplexed Access (CDMA) technique. FIG. 6 gives a schematic overview of CDMA encoding and decoding.

In order to encode a CDMA signal, base band signals, for example the user signals for each respective subscriber link, are encoded at 80-80N into a 160 ksymbols/sec baseband signal where each symbol represents 2 data bits (see, for example the signal represented at 81). This signal is then spread by a factor of 16 using a respective Walsh pseudo random noise (PN) code spreading function 82-82N to generate signals at an effective chip rate of 2.56 Msymbols/sec in 3.5 MHz. The signals for respective subscriber links are then combined and converted to radio frequency (RF) to give multiple user channel signals (e.g., 85) for transmission from the transmitting antenna 86.

During transmission, a transmitted signal will be subjected to interference sources 88, including external interference 89 and interference from other channels 90. Accordingly, by the time the CDMA signal is received at the receiving antenna 91, the multiple user channel signals may be distorted as is represented at 93.

In order to decode the signals for a given subscriber link from the received multiple user channel, a Walsh correlator 94-94N uses the same pseudo random noise (PN) code that was used for the encoding for each subscriber link to extract a signal (e.g, as represented at 95) for the respective received baseband signal 96-96N. It will be noted that the received signal will include some residual noise. However, unwanted noise can be removed using a low pass filter.

The key to CDMA is the application of orthogonal codes that allow the multiple user signals to be transmitted and received on the same frequency at the same time. To avoid the noise floor rising during spreading of the signals using PN codes as the number of user signals increases, Rademacher-Walsh codes are used to encode the spread user signals. Once the bit stream is orthogonally isolated using the Walsh codes, the signals for respective subscriber links do not interfere with each other.

Walsh codes are a mathematical set of sequences that have the function of "orthonormality". In other words, if any Walsh code is multiplied by any other Walsh code, the results are zero.

The following example will illustrate this using a four bit spreading code for ease of illustration, rather than the 16 bit spreading code preferred in practice.

| Incoming User Bit Stream | PN Code Spreading (x4) | Application of Walsh Codes | | Transmit Code |
|---|---|---|---|---|
| '1' | 1011 | 0000 | 0000 | |
| '0' | 1010 | 1100 | 1000 | |
| | | | | 0010 |
| '1' | 0110 | 1010 | 0100 | |
| '1' | 0111 | 1001 | 1110 | |

Figure 7:
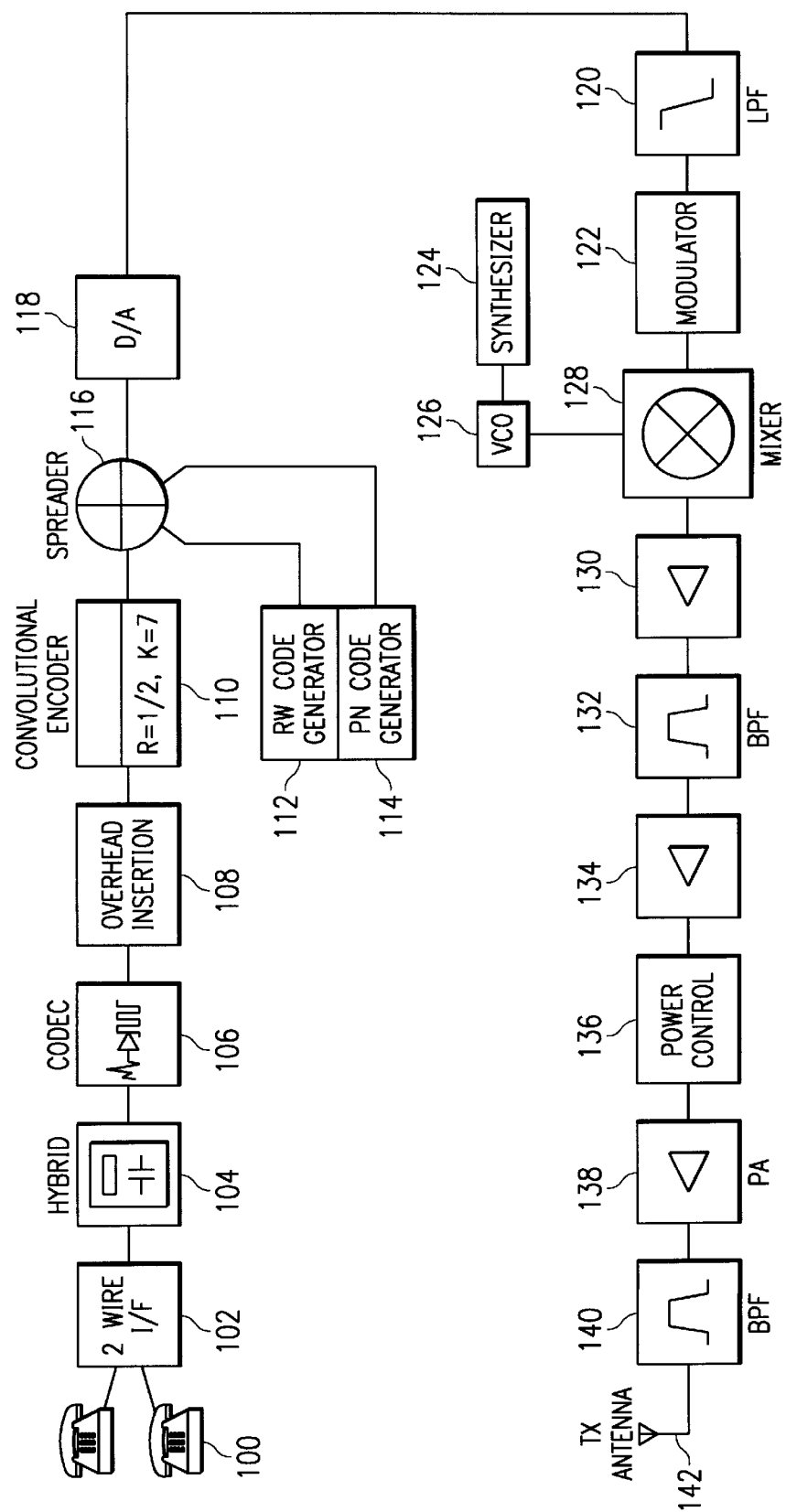
FIG. 7 is a schematic diagram illustrating signal transmission processing stages for the telecommunications system of FIG. 1.

FIG. 7 is a schematic diagram illustrating signal transmission processing stages as configured in a subscriber terminal 20 in the telecommunications system of FIG. 1. The central terminal is also configured to perform equivalent signal transmission processing. In FIG. 7, an analogue signal from one of a pair of telephones is passed via a two-wire interface 102 to a hybrid audio processing circuit 104 and then via a codec 106 to produce a digital signal into which an overhead channel including control information is inserted at 108. The resulting signal is processed by a convolutional encoder 110 before being passed to a spreader 116 to which the Radermacher-Walsh and PN codes are applied by a RW code generator 112 and PN Code generator 114, respectively. The resulting signals are passed via a digital to analogue converter 118. The digital to analogue converter 118 shapes the digital samples into an analogue waveform and provides a stage of baseband power control. The signals are then passed to a low pass filter 120 to be modulated in a modulator 122. The modulated signal from the modulator 122 is mixed with a signal generated by a voltage controlled oscillator 126 which is responsive to a synthesizer 160. The output of the mixer 128 is then amplified in a low noise amplifier 130 before being passed via a band pass filter 132. The output of the band pass filter 132 is further amplified in a further low noise amplifier 134, before being passed to power control circuitry 136. The output of the power control circuitry is further amplified in a further low noise amplifier 138 before being passed via a further band pass filter 140 and transmitted from the transmission antenna 142.

Figure 8:
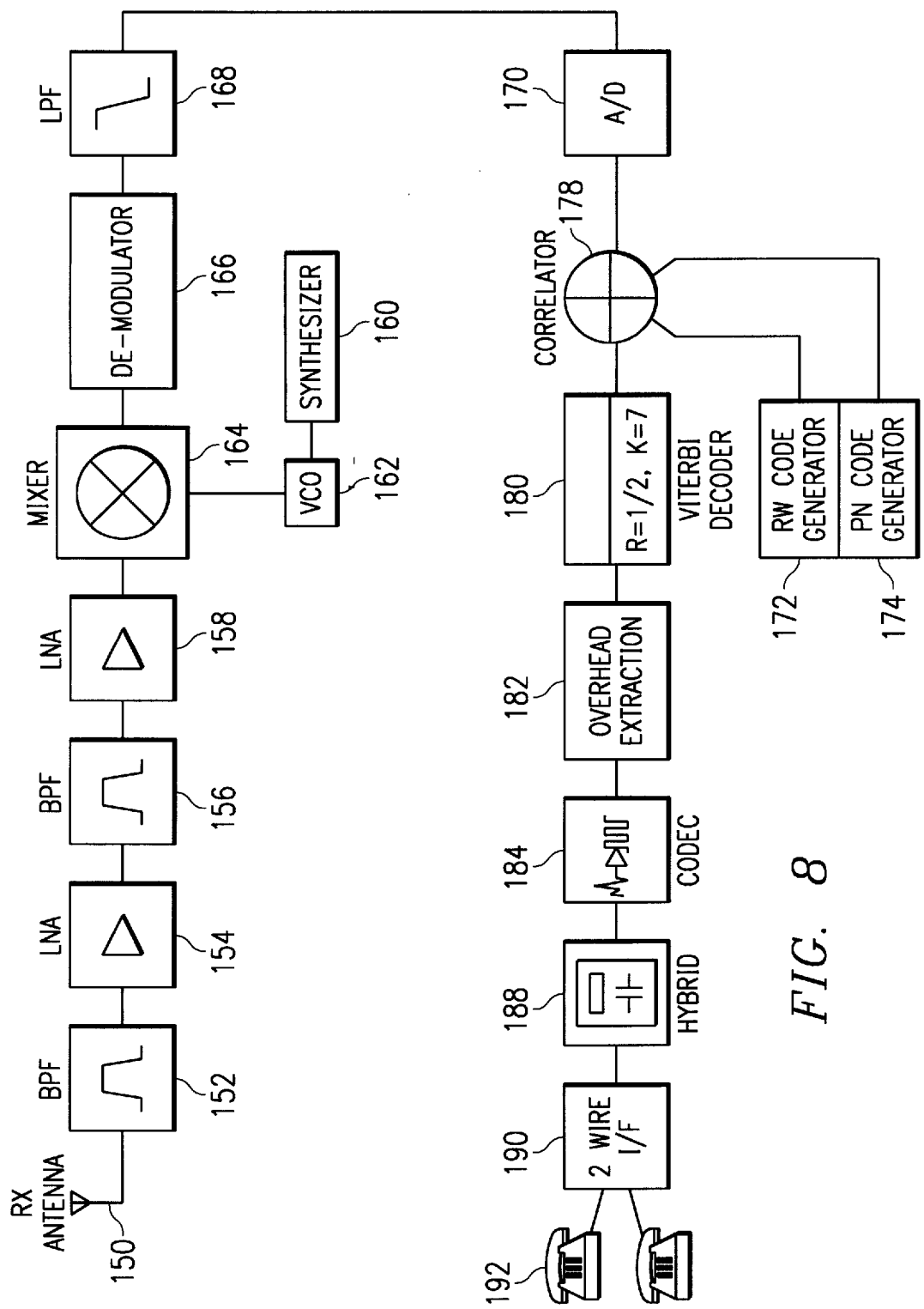
FIG. 8 is a schematic diagram illustrating signal reception processing stages for the telecommunications system of FIG. 1.

FIG. 8 is a schematic diagram illustrating the equivalent signal reception processing stages as configured in a subscriber terminal 20 in the telecommunications system of FIG. 1. The central terminal is also configured to perform equivalent signal reception processing. In FIG. 8, signals received at a receiving antenna 150 are passed via a band pass filter 152 before being amplified in a low noise amplifier 154. The output of the amplifier 154 is then passed via a further band pass filter 156 before being further amplified by a further low noise amplifier 158. The output of the amplifier 158 is then passed to a mixer 164 where it is mixed with a signal generated by a voltage controlled oscillator 162 which is responsive to a synthesizer 160. The output of the mixer 164 is then passed via the de-modulator 166 and a low pass filter 168 before being passed to an analogue to digital converter 170. The digital output of the A/D converter 170 is then passed to a correlator 178, to which the same Radermacher-Walsh and PN codes used during transmission are applied by a RW code generator 172 (corresponding to the RW code generator 112) and a PN code generator 174 (corresponding to PN code generator 114), respectively. The output of the correlator is applied to a Viterbi decoder 180. The output of the Viterbi decoder 180 is then passed to an overhead extractor 182 for extracting the overhead channel information. The output of the overhead extractor 182 is then passed via a codec 184 and a hybrid circuit 188 to a two wire interface 190 where the resulting analogue signals are passed to a selected telephone 192.

Figure 9:
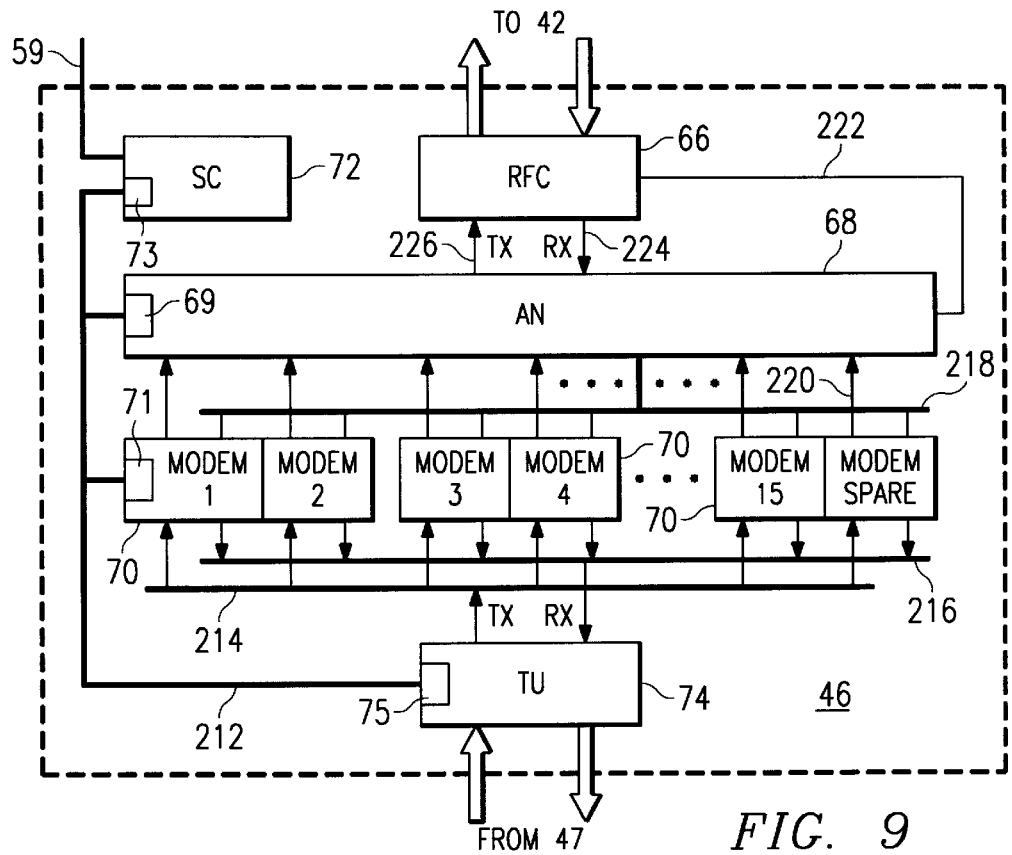
FIG. 9 is a schematic diagram illustrating in more detail the configuration of the modem shelf of FIG. 3A.

FIG. 9 is a schematic diagram illustrating in more detail the configuration of one of the modem shelves 46. The shelf controller 72 manages the operation of the whole of the modem shelf and its daughter network sub-elements (NSEs). The shelf controller (SC) 72 is provided with a RS232 serial port 59 for connection to the server 56 or to the pad 228. The shelf controller communicates control and data information via a backplane asynchronous bus 212 directly with the analogue card (AN) 68, the tributary unit card (TU) 74 and the modem cards (MC) 70. Other network sub-elements are connected via the modem cards. In a fully populated rack there will be four shelf controllers, one on each modem shelf. These four shelf controllers are configured to share the control of network service elements on other cards in the rack. The network service elements on the RF combiner shelf 42 are connected to the shelf controller backplane bus on each of the modem shelves. The shelf controller includes a master communications interface 73 for performing the communications functions mentioned above and other control functions. Each of the tributary card 74, the analogue card 68 and each modem card 70 includes a respective slave communications interface 74, 69 and 71, which manages the communications with the shelf controller 72. The RF card 66 is controlled from the analogue card 68, which is configured to provide the necessary control functions via the control path 222.

Also shown in FIG. 9 are the signal paths from an interface to the public switched telephone network (e.g via lines 47 in FIG. 3) and the interface to an RF combiner shelf 42.

The tributary unit 74 terminates the connection to the host public switched telephone network and handles the processing of telephony information for up to 15 subscriber terminals (up to 30 calls). The tributary unit 74 is 'on-line' in that it directly processes calls. The tributary unit 74 is also connected to a 2 Mb/s time-multiplexed (timeslot) transmit bus 214 and 2 Mb/s time-multiplexed (timeslot) receive bus 216 for transmit and receive calls, respectively.

The modems (1–15) on the modem cards 70 perform baseband signal processing of the transmit and receive signals including the convolution coding and spreading functions on the transmit signals, and the synchronisation recovery, de-spreading and error correction functions on the receive signals, as described earlier. Each modem is connected to the tributary unit 74 via the transmit and receive buses 214 and 216, and to the analogue card 68 via a dedicated connection 220 to one of a number of ports on the analogue card and via a digital CDMA RCV bus 218. Each of these dedicated connections includes multiplexed I, Q and control transmit paths.

The analogue card 68 performs A-D/D-A conversions, baseband filtering and vector summation of the 15 transmit signals from the modem cards. The analogue card 68 also scales the transmit signal power level according to high or low power levels. It is connected to the modem cards via the dedicated connections 220 and the digital CDMA RCV bus 218.

The RF card 66 generates the modulated transmit RF signals (at medium power level) and recovers and amplifies the baseband RF signal from the subscriber terminals 20. The RF card is 'on-line' in that it passes up to 30 calls simultaneously via the 15 available links, all on the same RF carrier. The RF card is connected to the analogue card via transmit and receive paths 226 and 224, respectively. The RF card is also connected to power amplifiers of the RF combiner shelf on the transmit side and to a low noise amplifier on the receive side. The power amplifiers (not shown) in the RF combiner shelf amplify the medium power output of the RF card 66 to an appropriate transmit power plus an amount to cover losses during signal combination and in the antenna feeder cable for the transmit signal. The low noise amplifier (not shown) is a low signal amplifier for overcoming losses in the antenna feeder etc. for the receive signal. The transmit carrier modulation is performed by the RF card 66 using an 'IQ modulator' at intermediate frequency and a single conversion to RF. The receive output of the RF card is at baseband in 'IQ' format as per the transmit input to the RF card.

Figure 10:
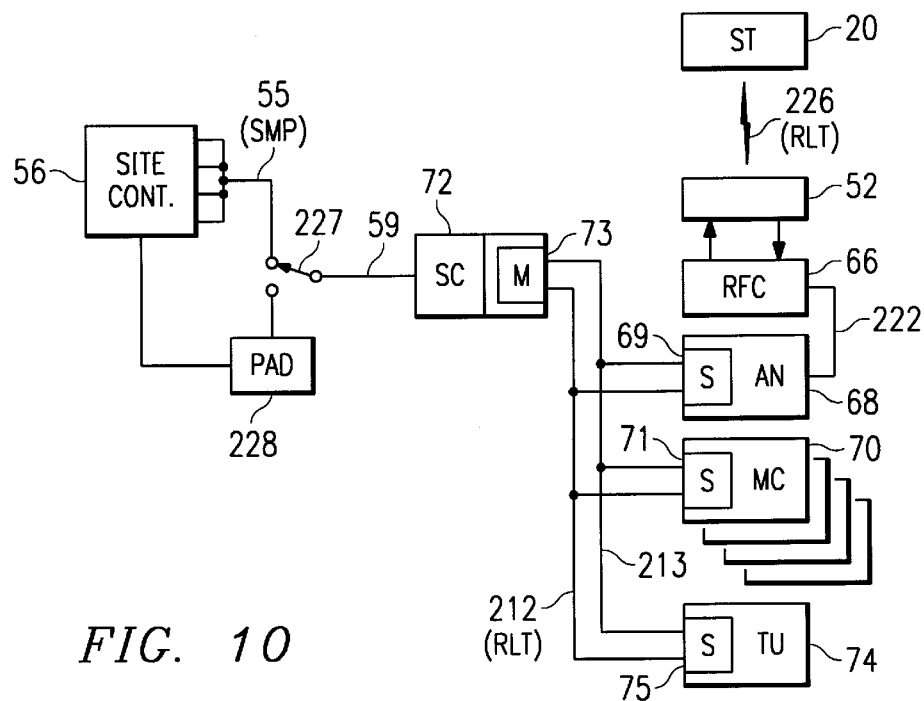
FIG. 10 is a schematic block diagram illustrating control protocols for a telecommunication system.

FIG. 10 is a schematic block diagram illustrating an example of various control protocols used for the transmission of control information between different parts of an example of a telecommunications system in accordance with the invention. It should be noted that FIG. 10 is directed to the control signal paths, and accordingly, the telephone call signal paths are not included. Many of the features of FIG. 10 have already been described above, and in this case the same reference numerals are used as before. Accordingly, these features will not be described again in detail.

A first protocol, called the Sub-system Management Processor (SMP) protocol, is used for communications between the shelf controller 72 and a server 56, or element manager 58, via lines 59 and 55, or 59 and 57, respectively. The first protocol is a balanced protocol with either party to a communication being able to initiate an exchange of information. The first protocol and the types of message which can be sent are described in more detail in United Kingdom Patent Application No. 9511192.8. As mentioned above, the shelf controller 72 is provided with an RS232 serial output for connection to a server 56 or to a pad 228.

A second protocol, called the Radio Link Termination (RLT) protocol, is used for passing control and data information via the control 212 and data 213 buses on the modem shelf. In addition, it should be noted that the same protocol is valid on the radio link 226 between the antenna 52 of the central terminal and the subscriber terminal(s) 20.

The second protocol is an unbalanced protocol with the microprocessor 73 in the shelf controller 72 acting as a busmaster (M) and the microcontrollers 69, 71 and 75 on the analogue card 68, the modem cards 70 and the tributary unit 74 acting as slaves.

As mentioned above, the server 56 maintains an object based control structure for control of the telecommunications system. The server and the control object 82 are so designed that control of the server (and hence the telecommunications system) is possible from a remote client station 64. The remote client station 64 may be a computer terminal or may be another server. Advantageously, control of the control object 82, and thus the communications system, is accomplished by way of operations. These operations may be either update or retrieve operations which are applied to the object control structure to control the communications system. Facets of the object based control structure will be further described later.

Figure 11:
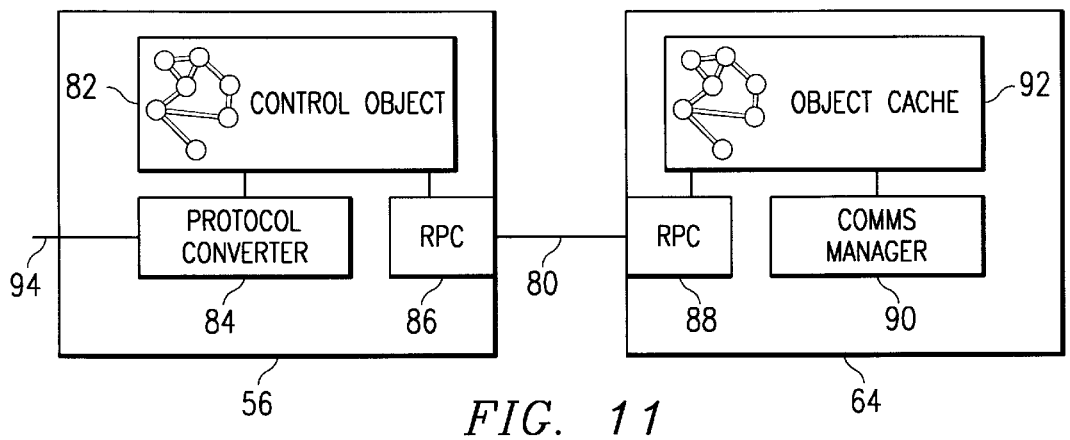
FIG. 11 illustrates a server which is connected via a data link to a client station.

FIG. 11 illustrates a server 56 which is connected via a data link 80 to a client station 64. The data link 80 may be any sort of link, either wired or wireless. Within the server 56 there are provided a control object 82, a protocol converter 84 and an RPC (Remote Procedure Call) interface 86.

Similarly, within the client station 64, there are provided an object cache 92, a communications manager 90 and an RPC interface 88.

The protocol converter 84 in the server 56 receives SMP messages from the central terminal 10. Also provided, but not shown, is an interface through which the messages from the central terminal 10, via a data link 94, are received. The protocol converter 84 converts the received SMP messages into operations which are then applied to the control object 82 to control the telecommunications system. The SMP to operation conversion process will be described in detail later.

The object cache 92 in the client station 64 maintains therein a map of the entire network to which that client station is connected. That map includes a copy of the control object 82 maintained in the server 56.

The communications manager 90 and the RPC interfaces 86 & 88 allow the creation and maintenance of reconfigurable dynamic interfaces between the client station 64 and, in this example, the server 56.

Figure 11B:
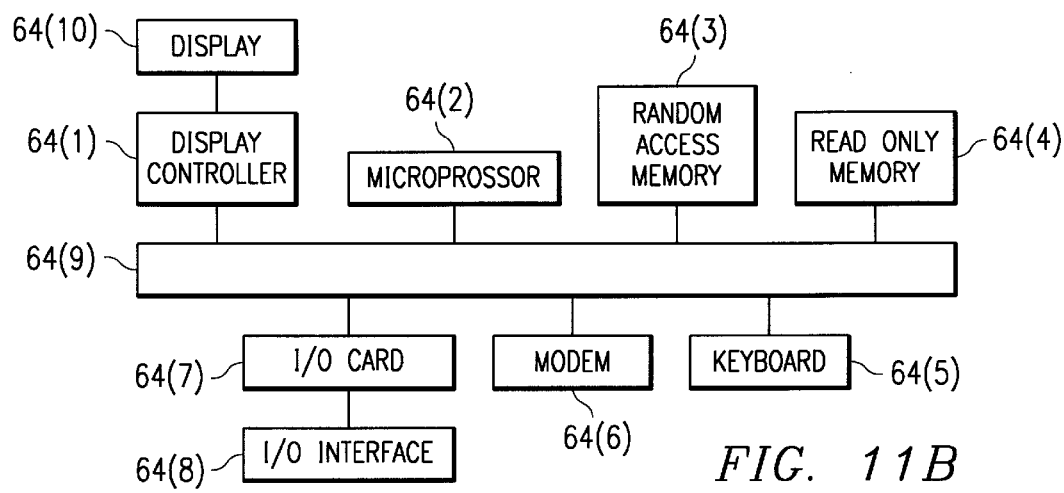
FIG. 11B illustrates an example of a suitable hardware configuration for a client station.

FIG. 11B illustrates an example of a suitable hardware configuration for a client station 64. With reference to FIG. 11B, the client station 64 may comprise a display controller 64(1), a microprocessor 64(2), a random access memory 64(3), a read only memory 64(4), a keyboard 64(5), a modem 64(6), an I/O card 64(7), an I/O interface 64(8), a common bus 64(9) and a display 64(10).

The display controller 64(1) controls the display 64(10) and allows the display of information to a user using the client station 64. The display controller 64(1) controls such functions as the display refresh rate and other commonly known functions. The display controller 64(1) is in communication with other components of the client station 64 so that information may be routed from the other components via the common bus 64(9) for display to the user.

The microprocessor 64(2) provides global control of the client station 64 and, as such, provides a means for a user to execute control functions in the client station 64. The random and read only memories 64(3) and 64(4) provide a memory in which the object cache 92, communications manager 90 and remote procedure call interface 88 may be maintained. The memories may also provide storage facilities for other information to be used within the client station 64 and beyond.

The keyboard 64(5) provides a means for a user to input commands to control the functions maintained in the memories. Alternative input devices may also be provided such as a mouse, trackerball or other commonly available devices.

The modem 64(6) provides a means for connecting the client station 64 to a remote server station via a telephone line, for example. Instructions generated by the functions maintained in the memories may be passed to the modem for conversion into a suitable format for broadcast down a telephone line.

The I/O (Input/Output) card 64(7) controls the I/O interface 64(8) and, as such, provides a means for connecting to remote devices by way of a serial or parallel port. Alternative I/O devices may also be provided to enable connection to a remote device via a network, for example. The I/O interface is, for example, a serial or a parallel port.

Whilst the client station 64 may be an ordinary personal computer, the performance of the device may be dramatically improved by providing dedicated read only memories for the object cache, comms manager and remote procedure call interface control functions. Variables used and generated by these functions may then be stored and manipulated by way of the random access memory. Such an arrangement would afford more memory to the processing of instructions and the generation of data.

It will also be understood that the representation of the client station in FIG. 11B is only a schematic and that many additional or alternative components may be provided if desired.

Figure 12B:
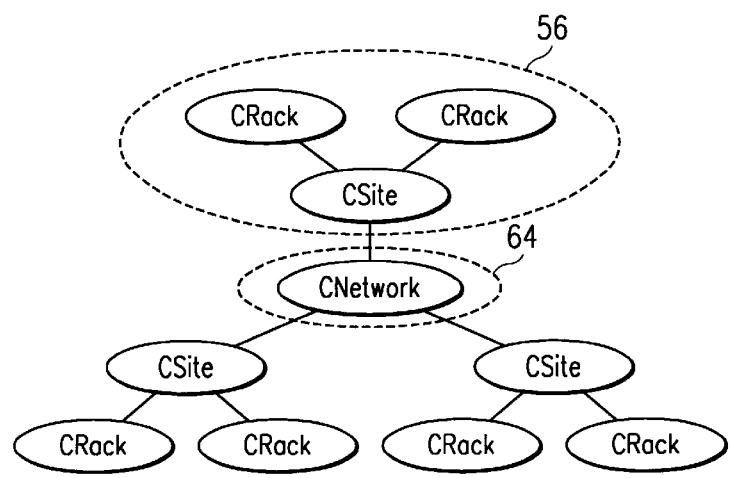
FIG. 12B illustrates a full network object relationship maintained in a local station object cache.
Figure 12:
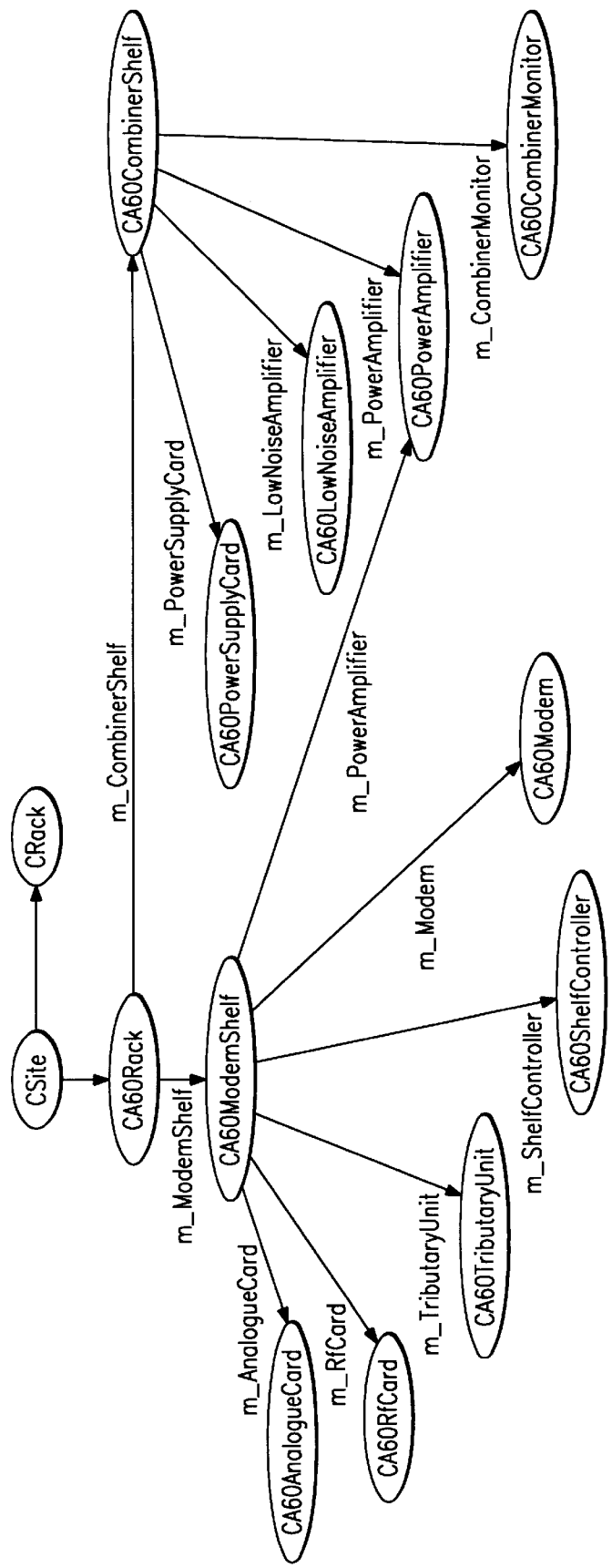
FIG. 12 is a schematic overview of a server and illustrates the relationship between various server objects.
Figure 13:
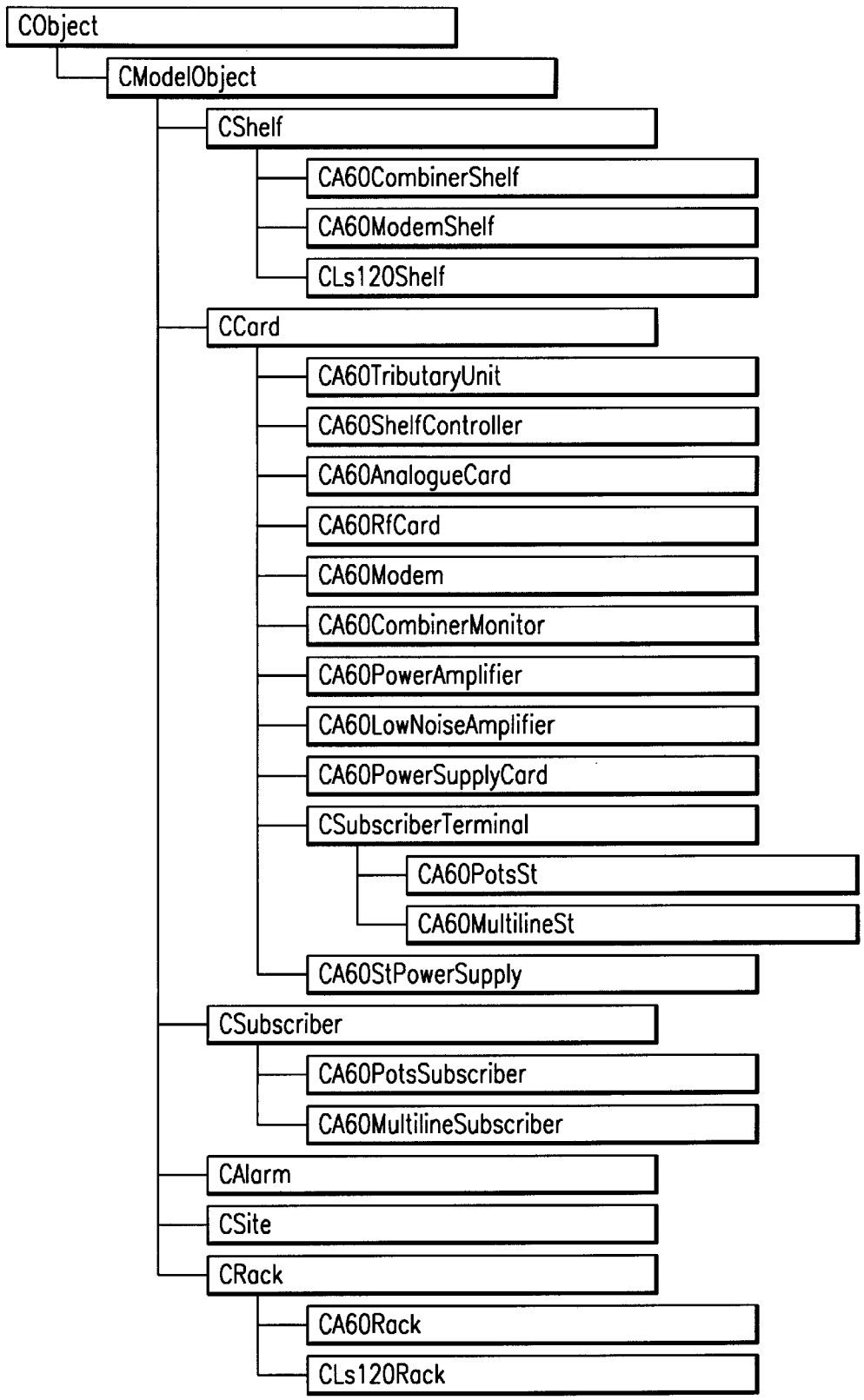
FIG. 13 provides one possible overview of a server object structure.

Returning to the control object 82 maintained in the server 56, FIG. 12 is a schematic overview of the server and illustrates the relationship between various server objects. The management and control of the telecommunications network including the central terminal, the subscriber terminals and the server, is based on the above mentioned hierarchical object-based data structure. FIG. 13 provides one possible overview of that data structure.

With reference to FIG. 12, there is shown a site (CSite) formed by a server station 64 as described above. The site (CSite) is shown as having a plurality of equipment racks (CRack, CA60Rack) associated therewith. One arm of the site, the CA60Rack arm, has been expanded. Any number of racks may be provided at any one site.

As shown in FIG. 12, the expanded CA60Rack arm has a plurality of objects associated therewith. Each of these objects relate to the control of a specific component of an equipment rack. As shown in FIG. 3, each rack comprises a RF combiner shelf, a power supply shelf and a number of modem shelves. Each modem shelf, as shown in FIG. 3A, may comprise a RF card, an analogue card, a tributary card, a shelf controller and at least one modem card. As shown in FIG. 12 each component of the server station has an object associated therewith. thus the CA60AnalogueCard object, for example, enables control of the analogue card on the modem shelf. Similar relationships exist between the other objects of FIG. 12 and the various components of the server station.

FIG. 12B illustrates the full network object relationship maintained in the local station object cache 92. When an operation is applied to the control object 82 from a local station 64, that operation may also be applied to the object structure maintained in the object cache 92 so that the state of any object in the control object 82 is readable from the local station object cache 92. The server station control object 56 has been indicated on FIG. 12B and the local station 64 is represented by the network object.

As may be seen from FIG. 12 and as mentioned above, the control object 82 in the server 56 essentially comprises an object for each component of the central terminal 10.

FIG. 13 provides one possible overview of the relational data structure illustrated in FIG. 12. With reference to FIG. 13, there is shown a CObject having a CModelObject child. The CModelObject has CShelf, CCard, CSubscriber, CAlarm, CSite and CRack children. These children have the CModelObject as their parent. Children may be created or destroyed and in order to implement the services of a child, one must first implement the services of the parent. Moving from parent to child is known as moving down the tree, whereas moving from child to parent is known as moving up the tree.

The CModelObject is known as the base class and comprises a multiplicity of basic services and data. The important data of the base class provides, as public data, pointers to the parent and children of any object in the object structure 82. As protected data, the base class provides an array of derived classes listing all parents and children in the control structure 82. As public services, the base class provides an update operation and a retrieve operation. The update operation is routed to its destination object with the aid of the data mentioned above and then used to update that destination object with state information embedded in the operation. The retrieve operation is routed to its destination in a similar manner, where it is filled by the state information of that destination. As protected services, the base class provides a routing operation which routes an update or retrieve operation to its destination object and then invokes a handling service to apply the operation. If the destination is not in existence at the time of the operation's arrival a create child service is called to create the destination object.

To summarise, the base class contains services and data that may be applied to an object by calling an update operation from any object above the destination object, routing the operation to the destination and then applying it. The state of any object may be obtained, in a similar fashion, by the retrieve operation. The routing, handling and creating of operations form the core functions of the CModelObject base class.

Operations are invoked by the operation construction service which is part of an operation base class. Other services provide information relating to the size and type of suitable operation code.

As mentioned above, all operations are reversible. This reversible nature is provided by four data classes which provide an address of the destination object, a flag indicating whether the operation is invertible, a before state and an after state. When an update operation is sent to a destination object in response to a call from that destination object or from any other object, the operation contains parameters embedded therein that provide state changes that are to be made to the destination object. These parameters are stored in the after state of the operation. Upon arrival of the operation at the destination object and before application of the parameters to the destination object, the current state parameters (ie. the destination object's state prior to application of the operation) is stored in the before state. The parameters stored in the after state may then be applied to the destination object to effect a change therein. When the before state is filled, the invertible flag is implemented to indicate that the operation is now reversible.

The resulting operation now comprises an address identifying the destination object, a before state of the object, an after state of the object and a flag indicating that the operation is reversible. If it is desired to reverse the operation, the state information from the before state is removed, applied to the object and the invertible flag is removed. This mechanism easily enables operations to be reversed by a fast "block copying" process whereby the before and after states are reversed.

This arrangement provides a significant improvement over previous arrangements which relied upon the generation of inverse operations to effect the reversal of a change to an object.

Some of the other objects illustrated in FIG. 13 will now be described in more detail below. Each of the objects includes a name field defining the name of the object and a status field containing status information about the object. The object may also contain one or more alarm parameters which can be set in response to specific alarm conditions relating, for example, to hardware errors, line malfunctions etc. The status field for an object includes a fault parameter which becomes set when at least one alarm parameter in the object or in a dependent object is set. In other words, when a fault parameter is set in one object, this fault status is propagated up the tree using the pointers to successive parent objects. Each of the objects also contains a definition of the object which can be used for displaying a representation, or view, of that object.

There is one site object (CSite) in the object structure. This contains data about the site and is created automatically when the object structure is initialised. As well as a name field and a status field, this object contains a field defining the site location and a list of rack objects that the site contains.

The CRack object has CA60Rack and CLs120Rack children, for example. Each child represents a rack and contain data about the rack including a name field, a status field, a pointer to the site object (CSite), and pointers to a shelf object.

The CCard object has, amongst others, a tributary unit object child (CA60TributaryUnit), a shelf controller object child (CA60ShelfController), an analogue card object child (CA60Analogue Card), a RF card object child (CA60RFCard), a modem object child (CA60Modem), a combiner monitor object child (CA60CombinerMonitor), a power amplifier object child (CA60PowerAmplifier), a low noise amplifier object child (CA60LowNoiseAmplifier), a power supply card object child (CA60PowerSupplyCard) and a subscriber terminal object child (CSubscriberTerminal).

The CShelf object has a CA60CombinerShelf object child which represents an RF combiner shelf and contains data about the combiner shelf including a name field, a status field, a pointer to the containing rack object (CRack), a pointer to the shelf's low noise amplifier card object (CA60LowNoiseAmplifier), and pointers to power amplifier card objects (CA60PowerAmplifier).

A modem shelf object child (CA60ModemShelf) of the CShelf object represents a modem shelf and contains data about the modem shelf including a name field, a status field, a pointer to the containing rack object (CA60Rack), an identifier field for the position of the shelf in the rack, a field for the identity of the serial port through which the site controller communicates with the shelf, a field for the baud rate for the serial port, a pointer to the shelf controller card object (CA60ShelfController), a pointer to a tributary card object (CA60TributaryUnit), a pointer to the RF card object (CA60RFCard), and pointers to a plurality of modem card objects (CA60Modem).

The modem card objects (CA60Modem) each represent a modem card and contain data about the card including a name field, a status field, a pointer to the modem shelf object (CA60ModemShelf) containing the modem card, an identifier number for the modem card and pointers to modem objects.

The shelf controller card object (CA60ShelfController) represents a shelf controller and contains data about the card including a name field, a status field and a pointer to the modem shelf object (CA60ModemShelf).

The Tributary unit card (CA60TributaryUnit) represents a tributary card and contains data about the card including a name field, a status field, a pointer to the modem shelf object (CA60ModemShelf), pointers to the card's tributary unit channels and a definition field for the protocol used by the tributary card.

The low noise amplifier card object (CA60LowNoiseAmplifier) represents an RF combiner shelf low noise amplifier card and contains data about the card including a name field, a status field and a pointer to an RF combiner shelf object.

The power amplifier card object (CA60PowerAmplifier) represents an RF combiner shelf amplifier card and contains data about the card including a name field, a status field and a pointer to the RF combiner shelf object.

In this way, the present technique provides a simplified hierarchical object-based control structure that is controllable by way of two operations. The present technique also improves the "connectability" of the object-based control structure as any input control data protocol may be converted into at least one of the above mentioned operations. Thus, a suitable protocol converter will allow the control structure to control any type of attached equipment regardless of the control data protocol adopted by that equipment. Just such a protocol converter will be later described below.

Figure 13B:
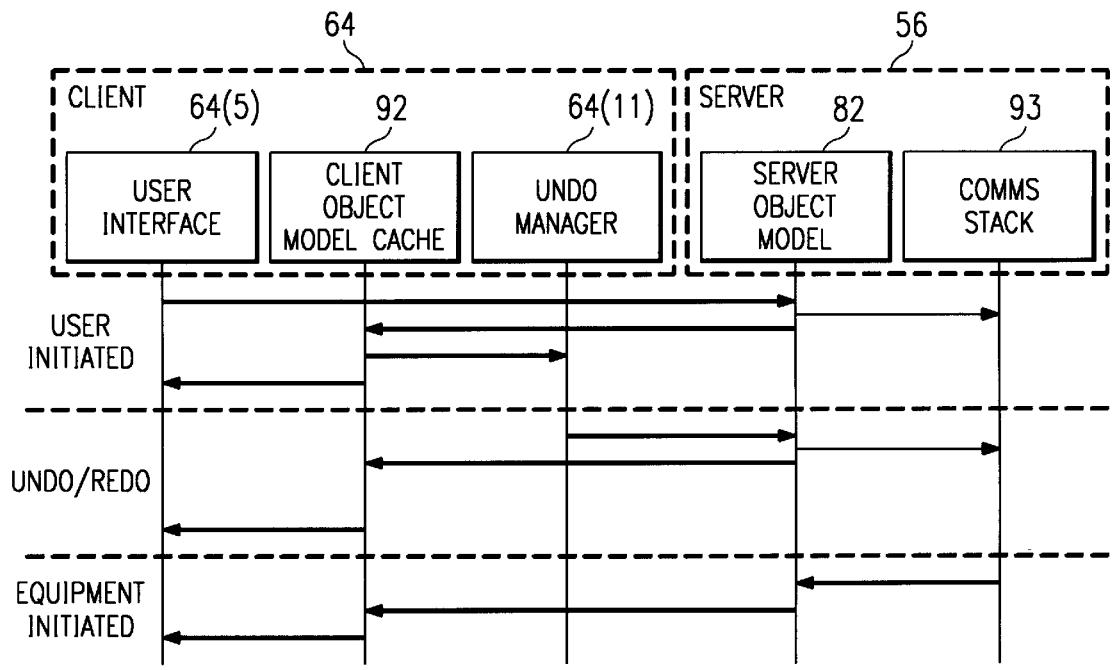
FIG. 13B illustrates the flow of operations between the client station 64 and the server station 56 in response to commands issued by a user.

FIG. 13B illustrates the flow of operations between the client station 64 and the server station 56 in response to commands issued by a user.

With reference to FIG. 13B, there are illustrated three mechanisms of operation manipulation and generation: "user initiated", "undo/redo" and "equipment initiated". These mechanisms provide a purely exemplary indication of the operating manner of the object based control system and are not to be considered as limiting the operation of the system to the three mechanisms alone. Indeed, it will be understood that a number of other mechanisms will also be provided to control the control system.

The "user initiated" mechanism will now be described. A user at the client station 64 enters commands via the user interface 64(5) (which may be a keyboard or other input device) to control the communications system. These commands are converted into a suitable protocol by a later described arrangement and passed to the server object model 82 maintained in the server 56. The commands are applied to the server object model 82 and cause changes in that object model. These changes are communicated to a communications stack (comms stack 93) generated by the protocol converter 84 in a manner to be later described, and from there to the communications system for control thereof. Simultaneously, these changes are communicated and applied to the object model maintained in the client object model cache 92 so that the client object model is in agreement with the server object model. These changes are then communicated to the user interface 64(5) where they cause an update of the user interface 64(5) that communicates to the user that their commands have been executed. The changes are also communicated to an undo manager 64(11) maintained in the client station that manages the reversing of operations within the control system.

In this way, the user is able to invoke control changes in the server object model and the attached communications system and be appraised when those control changes have been made. The user is also provided with the facility to reverse those changes, or to redo those changes if desired via the "undo/redo" mechanism.

The undo/redo mechanism will now be described. As described above, immediately prior to the application of an operation to an object, the state of that object is copied to a "before" state of the operation. The state parameters contained in the "after" state of the operation may then be applied to the object so as to effect a change in that object. If a user desires to effect a reversal of a change to an object, the state parameters stored in the before state of the operation are block copied to the after state and applied to the object concerned. Similarly, if a user wished to invoke a repeat application of the operation to the object, the state parameters of the object (which are now identical to the original after state parameter) may be retrieved into the after state of the operation and subsequently reapplied to the object.

FIG. 13B shows such an "undo/redo" procedure. Issuance of an undo or redo request by a user via the user interface 64(5) results in the application of the appropriate operation to the object model 82 maintained in the remote server 56. Application of that operation to the object model causes a change in that object model and the change is communicated to the object model maintained in the client object model cache 92 so that the object model cache is in agreement with the server object model. The change may also be communicated to the communications system via the comms stack 93 thereby to control the communications system. The changes communicated to the client object model cache 92 would similarly change the object models maintained in that cache and those changes may be communicated to the user via the user interface 64(5) so as to inform the user that the undo/redo instruction has been executed.

Occasionally, the communications system will generate messages that are applied to the server object model 82 and effect changes in that object model. Such an occasion is illustrated in the "equipment initiated" mechanism. These messages may be error messages, for example. The changes in the server object model 82 are communicated to the object model in the client object model cache 92 and from there to the user interface to appraise the user of the "equipment initiated" changes to the telecommunications system.

In this way, the use of an object based control system relying on two fundamental operations greatly facilitates the communication of information between stations of the communications control system.

Figure 14:
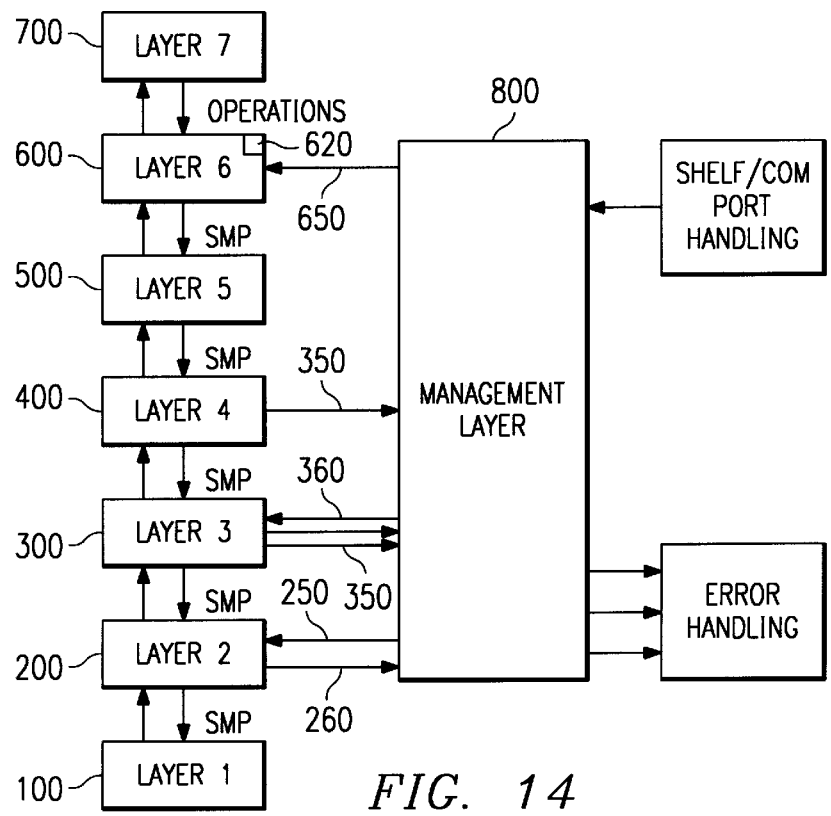
FIG. 14 illustrates schematically a possible configuration for a comms stack of a protocol converter.

As mentioned above, the protocol converter 84 maintained in the server 56 converts SMP messages from the central terminal 10 into operations for control of the control object 82 maintained in the server 56. FIG. 14 illustrates schematically a possible configuration for the protocol converter 84.

The protocol converter can be thought of as having a plurality of layers, shown as layers 1 to 7 in FIG. 14. The seven layer protocol converter adopts the Open Systems Interconnection (OSI) reference model and thus conforms to international standards. This seven layer architecture is collectively known as a communications stack or comms stack—as shown in FIG. 13B - and will be referred to as such hereinafter. The protocol converter 84 dynamically assembles a comms stack whenever it receives an SMP message (or other protocol message) from the communications system that is to be converted into at least one operation. The comms stack is then disassembled after the at least one operation is communicated and applied to the server object model 82. Advantageously, the protocol converter can assemble and maintain a plurality of these comms stacks at any one time.

One of these comms stacks will now be described. A first layer 100 of the comms stack is the hardware, which in this case is the above mentioned interface between the control station 10 and the server 56.

A second layer 200 is a data link layer for transferring bytes of the message packets to and from the first layer and beyond. The second layer may be, for example, an RS232 link or a parallel port connection. The second layer 200 receives com port settings (arrow 250) and notifies errors (arrow 26) from and to a management layer 800.

A third layer 300 is a network layer for establishing connections between an object in the server and the second layer or an object in the server and a fourth layer, and for authenticating the identity of received SMP message packets. Authentication may be attained by a variety of well known methods, some of which have been described in detail in United Kingdom Patent Application No. 9511192.8. One means for invoking authentication will be later described with reference to FIG. 15.

The fourth layer 400 is a transport level. The transport level constructs frames of data from message packets received in the third layer. The fourth layer also detects and corrects errors in those third layer message packets. In addition, the fourth layer 400 destructures frames of data received from a sixth layer, via a fifth layer, into first protocol message packets. The fourth layer detects and corrects errors in the sixth layer message packets and transmits the corrected message packets to the third layer.

The fifth layer 500 performs no function in the comms stack herein described. That is to say, the fifth layer 500 serves only as a means for routing signals from the fourth layer to the sixth layer. It is, however, possible that some of the functions performed by other layers may be replicated here if desired. For example, the fifth layer could provide yet further error and security checking and correction if desired.

The sixth layer 600 is a presentation layer for encoding fourth layer first protocol message packets into operations, and for decoding operations from a seventh layer into first protocol message packets. These operations are, as mentioned above, either update or retrieve operations and contain target object information received via arrow 650—the significance and operation of the operations will be further described below.

The seventh layer 700 is an application layer applying the operations from the sixth layer to the control object 82 in the server 56. Similarly, the seventh layer 700 also passes operations from the control object 82 to the sixth layer 600 for conversion to SMP data frames.

Supervising operation of the comms stack 93 is a management layer 800 that is responsible for the comms stack and for managing errors outside of the scope of individual layers of the comms stack. The management layer 800 is capable of receiving information regarding the operation of the con ports and modem shelves and passing this information to the comms stack for correction of errors and authentication of message packets. The management layer 800 also manages the assembly and disassembly of comms stacks, as required.

From the above, it is apparent that the critical conversion of SMP message packets, or other protocol message packets, into operations, and vice versa, takes place in the sixth layer 600 of a comms stack of the protocol converter 84.

As mentioned above, operations are either update or retrieve operations. Update operations change the parameters of an object whereas retrieve operations obtain state information for a given object or piece of equipment. The operations are wholly and easily reversible and comprise a series of bytes. Generally, operations are constructed in a buffer laid out thus:

2 Bytes Operation type code

1 Byte Number of bytes in a target path identifier

N Bytes Bytes of the target path identifier

1 Byte Invertible flag

N Bytes Before State

N Bytes After State

The before state is the state of an object to which an operation is to be applied before the operation has been applied to that object. The after state is the state of the same object after the operation has been applied thereto. An operation is only reversible and the invertible flag will only be implemented when both the before and after states have been filled.

The conversion process will now be described. SMP messages from the central station 10 are processed by preceding layers of the comms stack such that discrete message packets are presented to the sixth layer for conversion into operations.

As a first step, the sixth layer executes a read procedure which reads SMP message packets, or other protocol message packets, into a buffer for conversion into an operation. At this stage a variety of different procedures are provided to cover eventualities where an incoming message has been corrupted by, for example, a failure of a piece of equipment or a loss of power.

Next, the sixth layer checks the status of the system element from which the message was transmitted and returns the state information for that element. The state information includes, amongst other information, the address of the element from which the message was transmitted and the address of its shelf. Various checks may be made at this point to ensure that the address of the system element and the shelf are valid.

Using the address of the shelf as a starting point, a search through an "SMP message to operation" conversion table 620 (or other protocol conversion table) is conducted and an operation address is retrieved that points to the object within the server that is to be changed. The conversion table is maintained in the sixth layer of the comms stack and is shown schematically in FIGS. 14, 17 and 18.

Next, change parameters (i.e. a state to which the server object is to be changed) are retrieved from the SMP message, or other protocol message, and added to the "after" section of the operation and the address of the object to which the operation is to be applied is added to the path identifier. The complete operation is then passed to the seventh level 700 for application to the object in the server 56 identified by the path identifier.

In this way, the comms stack of the protocol converter receives SMP messages from the central station 10 and any other connected equipment and converts these messages into operations for application to the object in the server. The process may be reversed so that operations from the object in the server are converted into SMP messages for application to and control of the central station 10.

By providing a suitable conversion table, the protocol converter may be used to convert messages from other types of equipment manufactured by different manufacturers. Thus, the server herein described may be connected to any central station 10 of a telecommunications network.

Figure 15:
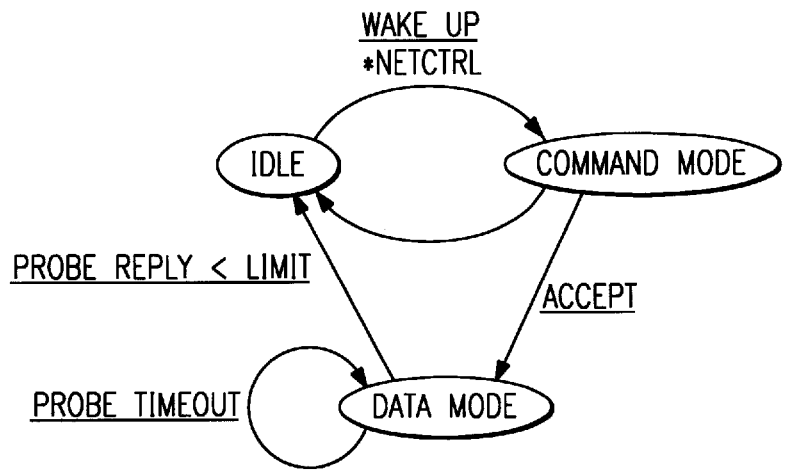
FIG. 15 shows one means for invoking authorisation in the third level of the comms stack.

FIG. 15 shows one means for invoking authorisation in the third level of the comms stack. With reference to FIG. 15, a state diagram for the third level authorisation invocation is shown.

In order to invoke authorisation, the third level of the comms stack generates probe messages that are periodically sent to a shelf controller in the control terminal of the communications system. The probe message is a sequence that may be inserted anywhere in the message sent from the third layer. Upon generation, the probe is inserted in a message packet that is sent from the third layer to the second layer where the message packet is disassembled into bytes for subsequent communication to the shelf controller.

Upon receipt of the probe, the shelf controller sends a reply which can occur anywhere in the message from the shelf controller. When the reply is received by the third layer, the third layer resets a timeout and removes the reply message from the message.

If no reply is received from two outgoing probes, for example, the third layer assumes that an error has occurred and that the comms stack is no longer in communication with the shelf controller. The third layer then goes into an authentication mode and disconnects the links between the second and fourth layers of the comms stack.

With reference to FIG. 15, upon creation the third layer is in an idle state (IDLE). When a "wakeup" string is sent by the shelf controller and recognised by the third layer a command state (COMMAND) is entered and a function *NETCTRL is sent out from the third layer to the shelf controller. If the shelf responds with an acceptance message (ACCEPT), a data mode (DATA) is entered. If no acceptance message is received from the shelf controller, the third layer returns to the idle state (IDLE).

The data mode (DATA) enables the movement of messages from the second layer to the fourth layer via the third layer. The data mode (DATA) also causes probes to be periodically generated and sent out to the shelf controller as indicated by the probe timeout loop (PROBE TIMEOUT) loop in FIG. 15. If the shelf controller fails to reply to the probe, the third layer returns to the Idle state, assumes that an error has occurred and invokes an authorisation process.

Figure 16:
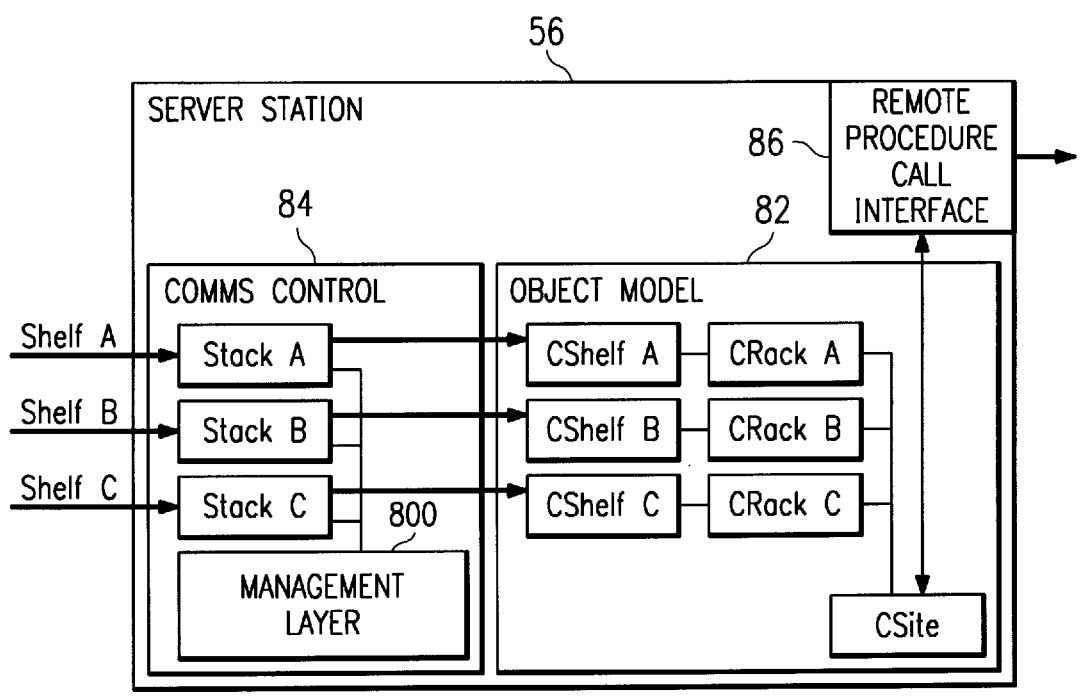
FIG. 16 illustrates a practical embodiment where the protocol converter communicates with a number of different communication system control stations.

FIG. 16 illustrates a practical embodiment where the protocol converter communicates with a number of different communication system control stations (as referenced by Shelf A to Shelf C).

As mentioned above, the protocol converter dynamically assembles and disassembles comms stacks when operations are received from the server object model and when messages are received from attached communications systems. FIG. 16 illustrates a scenario where three shelf controllers are attempting to interface with the server station 56. These three shelf controllers are referenced as Shelf A, Shelf B and Shelf C and may be identical control terminals for identical communications systems or may be different control terminals for different communications systems.

When the management layer 800 of the protocol converter 84 detects that a shelf is trying to interface with the server station 56, the management layer 800 constructs a comms stack for each piece of equipment attempting the interface. These comms stacks are shown in FIG. 16 as Stack A, Stack B and Stack C. These stacks receive messages from the shelves and convert those messages into operations for subsequent application to the server object model 82.

The management layer 800 maintains a list of all the connected ports and shelves in the server object model 82. Each item in that list has a pointer to the third layer of the comms stack which has been, or is to be, constructed for that equipment. Similarly, the messages generated by the sixth layer include a pointer to the correct object in the server object model. For example, as shown in FIG. 16, the messages from layer six that are to be applied to a CShelf A object in the server object model 82 would include a pointer to that object. The object model is also provided with pointers to list items in the management layer 800.

When an operation is sent from the object model to the equipment, the object model reads the pointer to the list item and sends the operation to the sixth layer via the item that it has a pointer to. Similarly, when an operation is sent to the server object model, that operation is sent to the object pointed to by the pointer in the list maintained in the management layer 800.

To summarise, a stack uses a pointer to an object in the object model in order to route operations from the stack to the object in the object model. Similarly, the object model uses a pointer to route operations back into the correct stack. These pointers are maintained in the management layer's list mentioned above.

Operations received by the object model may be applied in the normal way to invoke changes in the communications system. In addition, a remote client station 64 may be used to remotely control the server 56 by way of the remote procedure call interface 86 as will be later described.

Figure 17:
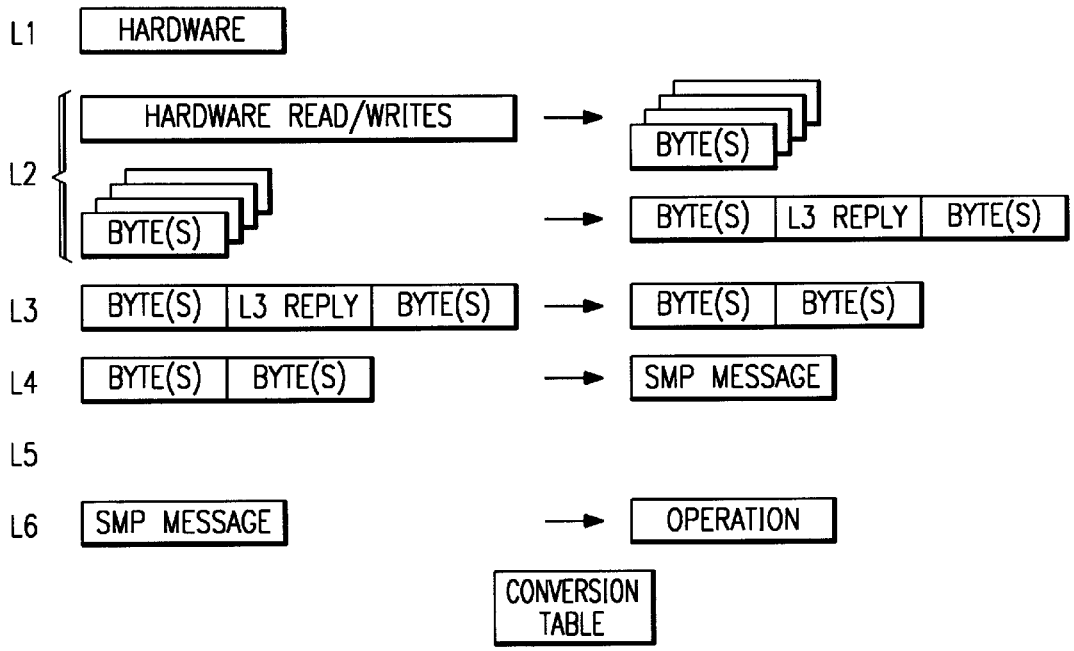
FIG. 17 illustrates a read operation carried out in the comms stack of FIG. 14.

FIG. 17 illustrates a read operation carried out in the comms stack of FIG. 14 to convert SMP (or other format) messages into operations. The black, upward arrows in FIG. 14 indicate this read procedure.

With reference to FIG. 17, messages arrive at layer 1 (L1) of a comms stack for conversion to an operation. As mentioned above, the first layer (L1) is the hardware which in this case is an interface such as a com port or parallel port etc. The second layer (L2) reads data from the interface to generate a plurality of data bytes (BYTES). These bytes are grouped into convenient packets for transfer to the third layer (L3). As mentioned above, the layer two packets may contain reply messages to any probes that had been previously issued by the third layer of the comms stack in a write procedure that will be later described below.

The third layer (L3) receives these message packets from the second layer (L2) and removes any probe replies. The resulting bytes are then transferred to the fourth layer (L4) where they are converted, as described above, into an SMP format. The SMP messages are then transferred to the sixth layer (L6) via a fifth layer (L5) which may have no function. The SMP messages received by the sixth layer (L6) are then converted into operations, by reference to the appropriate conversion table 620, for subsequent application to the server object model 82.

Figure 18:
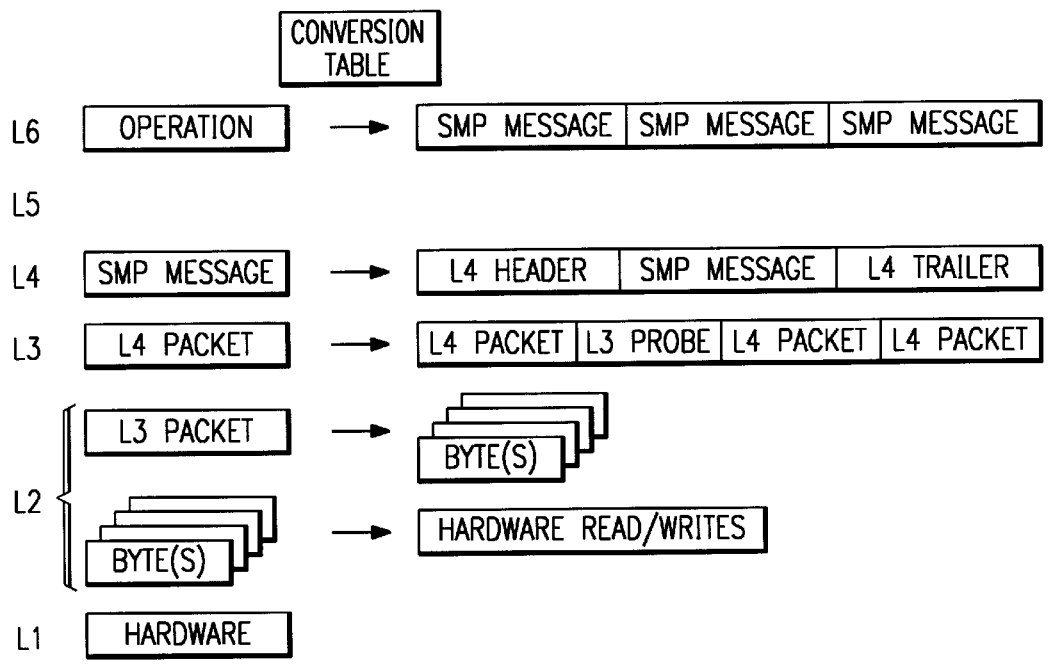
FIG. 18 illustrates a write operation carried out in the comms stack of FIG. 14.

FIG. 18 illustrates a write operation carried out in the comms stack of FIG. 14 to convert operations into SMP (or other format) messages. The downward arrows in FIG. 14 indicate this write operation. FIG. 18 illustrates a complementary opposite process to the process illustrated in FIG. 17.

With reference to FIG. 18, operations are received from the server object model 82 by the sixth layer (L6) of the comms stack. These operations are converted into a plurality of SMP Messages, by reference to the appropriate conversion table 620, and passed via the non-functioning fifth layer (L5) to the fourth layer (L4).

The fourth layer (L4) adds a fourth layer header and a fourth layer trailer to each of the SMP messages from the sixth layer (L6) to generate a fourth layer message packet (L4 PACKET). The fourth layer message packets are then passed to the third layer (L3) where a plurality of them are grouped together and a probe message is added if required. The resulting layer three packet is then passed to the second layer (L2).

The second layer (L2) disassembles the received third layer packets into a plurality of bytes which are then written to the layer one (L1) hardware interface.

Preferably, the read and write procedures described above all adopt the same prototype so that the levels of the comms stack are interchangeable.

It should also be noted that whilst a seven layer comms stack has been described above in detail, comms stacks having a different number of layers may be provided instead by removing some of the functions mentioned above to discrete layers. Thus, it should be noted the comms stack is not to be limited to the exact configuration herein described.

With reference to FIG. 11, operation of the above mentioned dynamic reconfigurable interface will now be described. The interface is enabled, disabled and reconfigured by way of the RPC's 86 & 88, the communications manager 90 and the object cache 92 maintained in the client station 64. As mentioned above, the object cache maintains a map of the entire network to which the client is connectable. Thus, the object cache map is provided with information regarding all connectable servers and the equipment with which they are provided.

For the purposes of the description of the interface, it should be imagined that, as shown in FIG. 11, the server 56 is connected to a remote client station 64 by a data link 80. A user working at the remote client station wishes to remotely control the server 56 and the object control structure maintained therein. Control of that structure enables control of the attached telecommunications system to be implemented.

The dynamic interface at the client station 64 advantageously enables a remote processing of operations on the server 56. That is to say that all processing (and hence changing and controlling of the control object 82) is undertaken at the server end of the interface and so removes any processor delays from the client station.

The dynamic interface is invoked by way of a remote procedure call interface object (RpcIf) and a connection manager object (CxnMgr), these being constructed/destructed by the RPC's 86 & 88 and the communication manager 90, respectively.

The RpcIf object provides services to construct and destruct objects, services to publish and revoke functions on the local station which services being invokable on a remote station, a service to initiate a listening process for remote services and two services to execute a function on a remote station.

The CxnMgr object provides services to construct and destruct objects, and services to connect and disconnect to/from a remote station.

When initiating a dynamic interface to a remote server 56 (as shown in FIG. 11), the local station 64 creates an RpcIf object (RpcIf) and a connection manager object (CxnMgr). Simultaneously, the remote server 56 has created an RpcIf object to listen for attempted remote connection. When the connection manager 90 achieves a connection to a remote server 56 a connection object is returned which specifies the location (Id) of the remote server 56 and the type of connection (Cxn) thereto. The RPC 86 on the remote server 56 then invokes remotely its "add local function" service to make available a function (F1) on the server 56. The RPC 88 on the local station 64 then invokes an "execute remote function" service which specifies the function to be executed remotely (F1), the type of connection (Cxn) and the remote server location (Id). The remote server 56 then locally executes the function F1 and returns the results to the local station 64.

The type of connection to be made (specified by Cxn) may be a network (eg. ethernet) connection, an RS232 connection or a modem link via a public telephone network.

As described above, the connection manager will always immediately open a connection to a remote server for each and every remote function invoked. When the connection type is a network, this is not inconvenient for the user. However, when the connection is made via a modem, for example, the user can be forced to wait repeatedly while the local station 64 initiates a link with the remote server 56. This can cause an unacceptable delay for the user.

In order to overcome this problem, the connection manager may be provided with a buffer that stores outgoing connection requests until a sufficient number of requests have been made to warrant the opening of a modem connection. Once this target has been reached, the connection manager would connect to the remote server and transmit multiple instructions to the remote server, thereby enabling a number of requests to be broadcast each time the modem link is established. The buffer could be switched in and out in reliance on the information contained in the Cxn object so that ethernet connections, for example, are not subject to the buffering process.

The object structure maintained in the local object cache may be updated while the connection manager is waiting to open a communication link so that, to the user, it appears that there is no delay between issuing instructions to make a change and the receipt of visual confirmation that the change has been implemented.

This dynamic interface also exhibits the advantage that remote functions may now be executed without having to transmit a large number of instructions to the remote station. Thus, the overall operating speed of the system is improved.

Although particular embodiments has been described herein, it will be appreciated that the present invention is not limited thereto and that many modifications and additions may be made within the scope of the invention and the attached claims. For example, whilst the different embodiments of the invention have been described above in relation to different aspects of a control system, it will be appreciated that this control system interfaces with various pieces of hardware and could be provided in a series of ASICs (Application Specific Integrated Circuits), if desired. In addition, it should be noted that whilst the foregoing description has been directed towards remote control of a server from a client station, it would be possible to remotely control a client station from a server or to remotely control a remote client station from a local client station. Thus, any of the devices described above may be provided on any station.

What is claimed is:

1. A protocol converter for a wireless telecommunications system, the protocol converter comprising:

an interface for receiving a message packet of a first protocol from at least one control station of the telecommunications system and for transmitting a first protocol return packet to the at least one control station; and a server in communication with the interface for maintaining an object based control structure of the wireless telecommunications system;

means for converting the first protocol message packet received from the interface into an operation to be applied to an object of the object based control structure, and for converting an operation into the first protocol return packet for subsequent transmission to the at least one control station via the interface, the operation being received from and applied to objects of the object based control structure maintained in the server thereby to control the wireless telecommunications system.

2. A protocol converter according to claim 1, wherein said converter has a multi-layer structure.

3. A protocol converter according to claim 2, wherein a first layer of the multi-layer structure is a line interface.

4. A protocol converter according to claim 3, wherein a second layer is a data link layer for transferring bytes of the first protocol message packets to and from the first layer.

5. A protocol converter according to claim 4, wherein a third layer is a network layer for establishing connections between an object in the server and a lower layer or an object in the server and a higher layer, and for authenticating the identity of first protocol message packets.

6. A protocol converter according to claim 5, wherein a fourth layer is a transport level, the transport level being provided for:
   (a) constructing frames of data from lower layer first protocol message packets and detecting and correcting errors in those lower layer message packets, or for
   (b) destructuring frames of data received from a higher layer into first protocol message packets, detecting and correcting errors in those first protocol message packets and transmitting those corrected message packets to the lower layer.

7. A protocol converter according to claim 6, wherein a sixth layer is a presentation layer for encoding lower layer first protocol message packets into at least one operation, and for decoding at least one operation from a higher layer into first protocol message packets.

8. A protocol converter according to claim 7, wherein a seventh layer is an application layer for receiving and outputting the at least one operation from a lower layer and/or for receiving at least one operation from the server.

9. A protocol converter according to claim 3, further comprising a management layer for supervising operation of the protocol converter and for managing errors outside of the scope of individual layers of the protocol converter.

10. A protocol converter according to claim 1, wherein said first protocol is a sub-system management protocol (SMP).

11. A protocol converter according to claim 1, wherein said operations are fully reversible.

12. A protocol converter according to claim 11 wherein the operation includes an "update" operation to update a state of the object to which the operation is applied or a "retrieve" operation to retrieve a current state of the object to which the operation is applied.

* * * * *